US008277657B2

(12) United States Patent
Lovley et al.

(10) Patent No.: US 8,277,657 B2
(45) Date of Patent: Oct. 2, 2012

(54) SYSTEMS AND METHODS FOR MICROBIAL REDUCTIVE DECHLORINATION OF ENVIRONMENTAL CONTAMINANTS

(75) Inventors: Derek R. Lovley, Leyden, MA (US); Sarah Strycharz, Alexandria, VA (US); Frank Loeffler, Decatur, GA (US)

(73) Assignee: University of Massachusetts, Boston, MA (US)

( * ) Notice: Subject to any disclaimer, the term of this patent is extended or adjusted under 35 U.S.C. 154(b) by 393 days.

(21) Appl. No.: 12/538,744

(22) Filed: Aug. 10, 2009

(65) Prior Publication Data

US 2010/0059436 A1 Mar. 11, 2010

Related U.S. Application Data

(60) Provisional application No. 61/087,450, filed on Aug. 8, 2008.

(51) Int. Cl.
*C02F 3/00* (2006.01)

(52) U.S. Cl. ...................................... 210/606; 210/748.1

(58) Field of Classification Search .................. 210/606, 210/748.1
See application file for complete search history.

(56) References Cited

U.S. PATENT DOCUMENTS

| 5,079,166 | A |   | 1/1992  | Winter et al.        |
|-----------|---|---|---------|----------------------|
| 5,403,450 | A | * | 4/1995  | Mellor et al. .......... 435/25 |
| 5,458,747 | A | * | 10/1995 | Marks et al. .......... 205/702 |
| 5,543,317 | A |   | 8/1996  | Shields et al.       |
| 5,602,296 | A | * | 2/1997  | Hughes et al. ........ 588/316 |
| 5,919,351 | A | * | 7/1999  | Rijnaarts et al. ..... 205/701 |
| 5,993,658 | A |   | 11/1999 | Kato et al.          |
| 6,190,526 | B1 | * | 2/2001 | Ho ................... 204/515 |
| 6,265,205 | B1 | * | 7/2001 | Hitchens et al. ..... 435/262 |
| 7,045,339 | B2 |   | 5/2006 | Sorenson, Jr.        |
| 7,709,113 | B2 | * | 5/2010 | Logan et al. .......... 429/2 |
| 7,922,878 | B2 | * | 4/2011 | Logan ................. 204/270 |
| 2002/0012987 | A1 | * | 1/2002 | Kataoka et al. ....... 435/262.5 |
| 2006/0257985 | A1 |   | 11/2006 | Lovley et al.       |
| 2007/0218540 | A1 | * | 9/2007 | Guiot et al. .......... 435/262.5 |
| 2008/0286624 | A1 |   | 11/2008 | Lovley et al.       |
| 2009/0017512 | A1 | * | 1/2009 | May et al. ............ 435/165 |
| 2009/0308808 | A1 | * | 12/2009 | Sewell ................ 210/610 |
| 2010/0126945 | A1 | * | 5/2010 | Patel et al. ........... 210/757 |
| 2011/0151544 | A1 | * | 6/2011 | Lovley et al. ........ 435/245 |

OTHER PUBLICATIONS

International Search Report and Written Opinion of the International Search Authority for related PCT Application No. PCT/US2009/053240, dated Apr. 1, 2010; Applicant: University of Massachusetts et al.; International Filing Date: Aug. 8, 2009; Applicant's Reference No. 21314-00014. 17 pages.

(Continued)

*Primary Examiner* — Chester Barry
(74) *Attorney, Agent, or Firm* — Brian M. Dingman; Mirick, O'Connell, DeMallie & Lougee, LLP

(57) ABSTRACT

In preferred embodiments, bioremediation systems are provided that comprise electricigenic microbes that use electrons provided directly from the anode of an electrical bioremediation system to carry out reductive dehalogenation of halogenated hydrocarbon contaminants, including chlorinated solvents. The present invention also provides methods of performing in situ bioremediation of halogenated solvents in groundwater or soil through the use of the provided systems.

17 Claims, 7 Drawing Sheets

OTHER PUBLICATIONS

Jung, Sokhee, and Regan, John M. 2007. Comparison of anode bacterial communities and performance in microbial fuel cells with different electron donors. *Appl. Microbial and Cell Physiology.* 77:393-402.

Shelobolina, Evgenya S., Vrionis, Helen A., Findlay, Robert H., and Lovley, Derek R. 2008. *Geobacter uraniireducens* sp. nov., isolated from subsurface sediment undergoing uranium bioremediation. *International Journal of Systematic and Evolutionary Microbiology.* 58:1075-1078.

Segura, Daniel, Mahadevan, Radhakrishnan, Juárez, Katy, and Lovley, Derek R. 2008. Computational and Experimental Analysis of Redundancy in the Central Metabolism of *Geobacter sulfurreducens. PLoS Computational Biology.* 4:1-12.

Bond, Daniel R., and Lovley, Derek R. 2003. Electricity Production by *Geobacter sulfurreducens* Attached to Electrodes. *Applied and Environmental Microbiology.* 69:1548-1555.

Srikanth, Shweta, Marsili, Enrico, Flickinger, Michael C., and Bond, Daniel R. 2008. Electrochemical Characterization of *Geobacter sulfurreducens* Cells Immobilized on Graphite Paper Electrodes. *Biotechnology and Bioengineering.* 99:1065-1073.

Brandt, Bernd W., Kelpin, Fleur D.L., van Leeuwen, Ingeborg M.M., and Kooijman, Sebastiaan A.L.M. 2004. Modelling microbial adaptation to changing availability of substrates. *Water Research.* 38:1003-1013. (2004).

Amos, B.K., J.A. Christ, L.M. Abriola, K.D. Pennell, and F.E. Löffler. 2007. Experimental evaluation and mathematical modeling of microbially enhanced tetrachloroethene (PCE) dissolution, *Environ. Sci. Technol.* 41: 963-970.

Anderson, Robert T., H.A. Vrionis, I. Ortiz-Bernad, C.T. Resch, P.E. Long, R. Dayvault, K. Karp, S. Martuzky, D.R. Metzler, A. Peacock, D.C. White, M. Lowe, and D.R. Lovley 2003. Stimulating the In-Situ Activity of *Geobacter* Species to Remove Uranium from the Groundwater of a uranium-Contaminated Aquifer, *Appl. Environ. Microbiol.* 69:5884-5891.

Aulenta, F., A. Catervi, M. Majone, S. Panero, P. Reale, and S. Rossetti. 2007. Electron transfer from a solid-state electrode assisted by methyl viologen sustains efficient microbial reductive dechlorination of TCE, *Environ. Sci. Technol.* 41: 2554-2559.

Bond, D.R., D.E. Holmes, L.M. Tender, D.R. Lovley. 2002. Electrode-reducing microorganisms that harvest energy from marine sediments. *Science.* 295: 483-485.

Bond, D.R., D.R., Lovley. 2003. Electricity production by *Geobacter sulfurreducens* attached to electrodes. *Appl. Environ. Microbiol.* 69(3): 1548-1555.

Chaudhuri, Swades K. and Lovley, D.R. 2003. Electricity Generation by Direct Oxidation of Glucose in Mediatorless Microbial Fuel Cells, *Nat. Biotech.*, 21:1229-1232.

Criddle, C.S. and P.L. McCarty. 1991. Electrolytic model system for reductive dehalogenation in aqueous environments, *Environ. Sci. Technol.* 25: 973-978.

Dec, Jerzy, K. Haider, J.M. Bollag 2003. Release of Substituents from Phenolic Compounds During Oxidative Coupling Reactions, *Chemosphere*, 52:549-556.

Fagervold, S.K., May, H.D., and Sowers, K.R. 2007. Microbial Reductive Dechlorination of Aroclor 1260 in Baltimore Harbor Sediment Microcosms Is Catalyzed by Three Phylotypes with the Phylum Chloroflexi. *Appl. Environ. Microbiol.* 73: 3009-3018.

Fung, J.M., Morris, R.M., Adrian, L., and Zinder, S.H. 2007. Expression of Reductive Dehalogenase Genes in *Dehalococcoides ethenogenes* Strain 195 Growing on Tetrachloroethene, Trichloroethene, or 2,3-Dichlorophenol. *Appl. Environ. Microbiol.* 73: 4439-4445.

Gregory, K.B., and D.R. Lovley. 2005. Remediation and recovery of uranium from contaminated subsurface environments with electrodes, *Environ. Sci. Technol.* 39: 8943-8947.

Gregory, K.B., D.R. Bond, and D.R. Lovley. 2004. Graphite Electrodes as electron donors for anaerobic respiration. *Environmental Microbiology* 6(6): 596-604.

Haveman, Shelley A., Dawn E. Holmes, Yan-Huai R. Ding, Joy E. Ward, Raymond J. DiDonato, Jr. and Derek R. Lovley 2006. c-Type cytochromes in *Pelobacter carbinolicus, Appl. Environ. Microbiol.* 72:6980-6985.

Kitunen, V.H., Valo, R.J., and M.S. Salkinoja-Salonen. 1987. Contamination of soil around wood-preserving facilities by polychlorinated aromatic compounds, *Environ. Sci. Technol.* 21:96-101.

Lovley, Derek R., 2006. Microbial Energizers: Fuel Cells that Keep on Going, *Microbe* 1:323-329.

Lovley, D.R. 2006. Bug juice: harvesting electricity with microorganisms, *Nature Reviews: Microbiology.* 4: 497-508.

Lovley, D.R. 2006. Microbial fuel cells: novel microbial physiologies and engineering approaches. *Curr. Op. Biotechnol.* 17: 327-332.

Lovley, D.R., R. Mahadevan, and K.P. Nevin. 2008. Systems biology approach to bioremediation with extracellular electron transfer. In E. Diaz (ed.), Microbial biodegradation, Genomics and molecular biology. Caister Academic Press, Norfolk, UK. pp. 71-96.

Major, David W., M.L. McMaster, E.E. Cox, E.A. Edwards, S.M. Dworatzek, E.R. Hendrickson, M.G. Starr, J.A. Payne and L.W. Buonamici 2002. Field Demonstration of Successful Bioaugmentation to Achieve Dechlorination of Tetrachloroethene to Ethene, *Environ. Sci. Technol.* 36:5106-5116.

Nevin, K.P., Kim, B.-C. Methe, B.A., Glaven, R. Covalla, S.F., Johnson, J.P., Franks, A.E. and D.R. Lovley. 2007. Reclassification of of *Trichlorobacter thiogenes* as *Geobacter thiogenes* comb. nov. *Internat. J. Systematic Evol. Microbiol.* 57: 463-466.

Reguera, G., Nevin, K.P., Nicoll, J.S., Covalla, S.F., Woodard, T.L., and D.R. Lovley. 2006. Biofilm and nanowire production leads to increased current in *Geobacter sulfurreducens* fuel cells. *Appl. Environ. Microbiol.* 72(11): 7345-8.

Richter, Hanno, M. Lanthier, K.P. Nevin and D.R. Lovley 2007. Lack of Electricity Production by *Pelobacter carbinolicus* Indicates that the Capacity for Fe(III) Oxide Reduction Does Not Necessarily Confer Electron Transfer Ability to Fuel Cell Anodes, *Amer. Soc. Microbiology* 73:5347-5353.

Sanford, R.A., Cole, J.R., and J.M. Tiedje. 2002. Characterization and description of *Anaeromyxobacter dehalogenans* gen. nov., sp. nov., an aryl-halorespiring facultative anaerobic myxobacterium, *Appl. Environ. Microbiol.* 68(2):893-900.

Strycharz, S.M., Woodard, T.L., Johnson, J.P., Nevin, K.P., Sanford, R.A., Löffler, F.E., and Lovley, D.R., Graphite Electrode as a Sole Electron Donor for Reductive Dechlorination of Tetrachlorethene by *Geobacter lovleyi, Appl. Environ. Microbiol.*, Oct. 2008, 74(19): 5943-5947.

Sun, B., Cole, J.R., Sanford, R.A., and Tiedje, J.M. 2000. Isolation and Characterization of *Desulfovibrio dechloracetivorans* sp. nov., a Marine Dechlorinating Bacterium Growing by Coupling the Oxidation of Acetate to the Reductive Dechlorination of 2-Chlorophenol, *Appl. Environ. Microbiol.* 66: 2408-2413.

Sun, B., Griffin, B.M., Ayala-del-Rio, H.L., Hashsham, S.A., and Tiedje, J.M. 2002. Microbial Dehalorespiration with 1,1,1-Trichloroethane. *Science.* 298: 1023-1025.

Sung, Y., K.E. Fletcher, K.M. Ritalahti, R.P. Apkarian, N. Ramos-Hernandez, R.A. Sanford, N.M. Mesbah, F.E. Löffler. 2006. *Geobacter lovleyi* sp. nov. Strain SZ, a novel metal-reducing and tetrachloroethene-dechlorinating bacterium, *App. Env. Microbiol.* 72(4): 2775-2782.

Sung, Y., Ritalahti, K.M., Sanford, R.A., Urbance, J.W., Flynn, S.J., Tiedje, J.M., and Loftier, F.E. 2003. Characterization of Two Tetrachloroethene Reducing Acetate Oxidizing Anaerobic Bacteria and Their Description as *Desulfuromonas michiganensis* sp. nov. *Appl. Environ. Microbiol.* 69: 2964-2974.

The Parsons Corporation 2004. Principles and Practices of Enhanced Anaerobic Bioremediation of Chlorinated Solvents, presented Aug. 2004 to the Air Force Center for Environmental excellence, Naval Facilities Engineering Service Center and Environmental Security Technology Certification Program.

U.S. Department of Defense, Environmental Security Technology Certification Program, 2005. Bioaugmentation for Remediation of Chlorinated Solvents: Technology Development, Status, and Research Needs presented by GeoSyntec Consultants.

Vrionis, Helen A., R.T. Anderson, I. Ortiz-Bernad, K.R. O'Neill, C.T. Resch, A.D. Peacock, R. Dayvault, D.C. White, P.E. Long and D.R. Lovley 2005. Microbiological and Geochemical Heterogeneity in an In Situ Uranium Bioremediation Field Site, *Appl. Environ. Microbiol.* 71:6308-6318.

Yu, S.L. Semprini. 2004. Kinetics and modeling of reductive dechlorination of high PCE and TCE concentrations, *Biotechnology and Bioengineering* 88(4): 451-461.

* cited by examiner

SYSTEMS AND METHODS FOR MICROBIAL REDUCTIVE DECHLORINATION OF ENVIRONMENTAL CONTAMINANTS

RELATED APPLICATION

This application claims benefit of U.S. Provisional Patent Application 61/087,450, filed Aug. 8, 2008, the entire contents of which are incorporated by reference for all purposes.

STATEMENT REGARDING FEDERALLY SPONSORED RESEARCH

Research carried out in connection with this invention was supported in part by the Office of Naval Research grant OGCA-1070875. Accordingly, the United States government may have certain rights in the invention.

FIELD OF THE INVENTION

The present invention relates generally to bioremediation. Specific embodiments relate to compositions and methods for bioremediation of chlorinated hydrocarbons by microorganisms, including a bioremediation system using a powered source electrode and a microorganism capable of reductive dechlorination and capable of utilizing electrons directly from the source electrode for electron transfer and reduction of contaminants.

BACKGROUND OF THE INVENTION

Chlorinated hydrocarbon compounds, in particular, chlorinated hydrocarbon solvents, are prevalent contaminants of groundwater and aquatic sediments. Halogenated hydrocarbons have low flammability and are fairly stable, both chemically and biologically. They have been commonly used in industry as chemical carriers and solvents, paint removers, and cleaners. Chlorinated solvents are stable compounds that are relatively toxic at low levels, and many chlorinated solvents have been classified as suspected or confirmed carcinogens. Chlorinated hydrocarbon solvent contaminants include chlorinated ethylene compounds such as tetrachloroethylene (also known as perchloroethylene, PCE), trichloroethylene (TCE) and dichloroethylene (DCE), as well as various other halogenated aliphatic compounds and solvents.

In the United States, both PCE and TCE were found at 852 of 1430 National Priority List (NPL) sites in 1997, establishing these chlorinated hydrocarbon compounds as two of the most common groundwater contaminants identified in superfund sites (Doherty, R. E. 2000. A history of the production and use of carbon tetrachloride, tetrachloroethylene, trichloroethylene and 1,1,1-trichloroethane in the United States: Part 2-Trichloroethylene and 1,1,1-trichloroethane. *J. Environ. Foren.* 1: 83-93). These contaminants typically originated from residual dumps from industrial use, or from spills or leaks. Typical contaminated sites contain chlorinated hydrocarbon solvents dissolved in groundwater, chlorinated hydrocarbon solvents in ground dense non-aqueous phase liquid (DNAPL), or both. Even a small spill can result in large, dispersed plumes of chlorinated hydrocarbon solvents that are very difficult and expensive to treat. Thus, even relatively small amounts of solvent can pose serious risks to the environment and to water supplies.

In situ remediation of contaminated groundwater aquifers allows treatment of contaminants on site, which can lead to less expensive and less destructive processes of removal. However, current abiotic and biotic in situ remediation strategies available for groundwater contaminated with chlorinated DNAPLs have limitations and drawbacks.

For example, abiotic treatment methods have included passive systems, such as permeable reactive barriers that can be constructed of materials like zero-valent iron. This method can be costly, depending on the site location and depth of the contaminated aquifer. Electrochemical reactors have also been investigated as a means for abiotic reductive dehalogenation of chlorinated groundwater contaminants. Such abiotic processes are limited by electrode material, temperature, ionic strength and pH of the groundwater, transportation of the target compound to the surface of the cathode, and the rate of charge transfer to the surface of the cathode.

As an alternative to abiotic groundwater treatment, naturally occurring biotic reductive dechlorination has been applied to field site applications for removal of chlorinated DNAPLs. Bioremediation of chlorinated hydrocarbons by microorganisms that respire compounds via reductive dechlorination has been studied and implemented as a biological treatment of compounds such as PCE and TCE through bioaugmentation, the addition of dechlorinating microorganisms, or biostimulation, the stimulation of existing dechlorinators through the addition of electron donors or nutrient amendments (Czaplicka, M. 2004. Sources and transformations of chlorophenols in the natural environment, *Sci. Total Environ.* 322:21-39). Limitations of current applications of bioremediation for contaminant removal from groundwater include buildup of toxic degradation products, such as vinyl chloride (VC). Additionally, when hydrogen is supplied as an electron donor for stimulation of bioremediation, dechlorinating microbes compete with other hydrogen-utilizing bacteria such as nitrate and sulfate reducers, methanogens, and acetogens. Yet another limitation of reductive dechlorination in a source zone contaminated with chlorinated DNAPLs is intolerance of dechlorinating microorganisms to saturated concentrations of chlorinated substrate, commonly found at source zones.

The possibility of promoting degradation of chlorinated contaminants with electrical current has been investigated previously. However, these approaches are not appropriate for in situ treatment of chlorinated contaminants in aquifers or in aquatic sediments. For example, electrodes poised at low potentials can abiotically dechlorinate the chlorinated solvents PCE and TCE as well as less chlorinated compounds such as VC and the dichloroethylene isomers (DCE). Potentiostat-poised electrodes used to supply hydrogen as an electron donor to bacteria have been suggested for use in groundwater or soil to stimulate reductive dechlorination. Additionally, electrolysis of chlorinated compounds has been suggested to inadvertently stimulate soil microbes (Skadberg, B., et al., 1999. Influence of pH, current and copper on the biological dechlorination of 2,6-dichlorophenol in an electrochemical cell. *War Res.* 33(9): 1997-2010). However, these approaches have significant limitations for in situ treatment of groundwater or soil because: 1) hydrogen gas is produced, which can stimulate the growth of anaerobic microorganisms resulting in the accumulation of unwanted biomass and production of undesirable end-products, such as Fe(II), sulfide, and methane that deteriorate water quality; 2) reduction of protons results in high groundwater pH which disrupts biological, chemical, and physical properties of the soil; and 3) non-specific reduction of protons, and possibly other groundwater constituents, results in poor efficiency in electron transfer to the chlorinated contaminants of interest.

Transferring electrons from an electrode to microorganisms capable of reductive dechlorination has been proposed through use of shuttle compounds, such as methylviologen (Aulenta, F., et al., 2007. Electron transfer from a solid-state electrode assisted by methyl viologen sustains efficient microbial reductive dechlorination of TCE, *Environ. Sci. Technol.* 41: 2554-2559). However, methylviologen (1,1'-dimethyl-4,4'-bipyridinium dichloride, also known as paraquat dichloride) itself is highly toxic and thus is considered a contaminant.

Certain microorganisms have been shown to be electricigenic, and interact electrochemically with electrodes without requiring an electron shuttle such as methylviologen. As used herein, "electricigen" or "electricigenic bacteria" refer to microbes that conserve energy to support growth by completely oxidizing organic compounds to carbon dioxide with direct electron transfer to the anodes of microbial fuel cells. Electricity production with electricigens is significantly different from that of other types of microorganisms. See, e.g., Lovley, D. R & Nevin, K. P. (2008) Electricity Production with Electricigens, pp. 295-306 in Wall, J., et al., ed. Bioenergy, ASM Press, Washington, D.C. Electricigens have the ability to oxidize organic compounds to carbon dioxide with an electrode serving as the sole electron acceptor, providing high coulombic efficiency that is not available with other microbes.

In such cases, the electricigenic microorganism was found to donate electrons to an anode of a microbial fuel cell, which serves as an electron acceptor for these microorganisms. See Bond, D. R., D. R., Lovley. 2003. Electricity production by *Geobacter sulfurreducens* attached to electrodes. Appl. Environ. Microbiol. 69(3): 1548-1555; Bond, D. R., et al. 2002. Electrode-reducing microorganisms that harvest energy from marine sediments. Science. 295: 483-485. There have also been limited demonstrations where an electrode poised at a sufficiently low potential has been shown to serve as an electron donor for *Geobacter sulfurreducens* or *Geobacter metallireducens*. These species were shown to accept electrons from a graphite electrode for the reduction of more electrochemically positive electron acceptors such fumarate, nitrate, or U(VI). See Gregory, K. B., et al., 2004. Graphite Electrodes as electron donors for anaerobic respiration. *Environmental Microbiology* 6(6): 596-604; and Gregory, K. B., and D. R. Lovley. 2005. Remediation and recovery of uranium from contaminated subsurface environments with electrodes, *Environ. Sci. Technol.* 39: 8943-8947.

For reductive dechlorination as a bioremediation strategy to be successful, dechlorinating microorganisms and a suitable electron donor must both be localized at or near a source zone of contamination, and be effective without producing resulting toxic effects. Appropriate addition of a chemical electron donor without unduly stimulating growth of unwanted non-dechlorinating microorganisms, or inhibiting growth of beneficial dechlorinating microorganisms can be particularly challenging.

SUMMARY OF THE INVENTION

In preferred embodiments, the present invention provides bioremediation systems for performing in situ bioremediation of one or more halogenated contaminants in a contaminated source zone. The bioremediation systems include an electrical power supply, an anodal source electrode, a cathodal counter electrode, and a microorganism biocatalyst comprising an electricigenic microbe that uses electrons from the source electrode to carry out a reductive dehalogenation of contaminant that is present in the soil, the groundwater, or both. The provided bioremediation systems advantageously have a continuous localized physical source of electrons, which is less likely to enhance undesired activity of competing microorganisms and does not add toxic residual compounds to a contaminated site.

In preferred embodiments, the microorganism biocatalyst comprises an exogenous microbe provided to the bioremediation system. In certain preferred embodiments, the microorganism biocatalyst is pre-inoculated on the provided source electrode, where the microorganism biocatalyst comprises an electricigenic microbe and optionally one or more substances that facilitate the formation and stability of a biofilm of the electricigenic microbe on the electrode. In still other embodiments the microorganism biocatalyst can comprise an indigenous microorganism that is found at a contaminated source zone.

Provided bioremediation systems are useful for bioremediation of halogenated contaminants including chlorinated solvent contaminants. In certain embodiments, chlorinated solvent contaminants for bioremediation of chlorinated solvent using the provided systems may include any of tetrachloroethene, trichloroethene, cis-dichloroethene, vinyl chloride, trichloroethane, tetrachloroethane, dichloroethane, chlorophenol, trichlorobenzenes, chlorobenzoate, chloroacetic acid, and a mixture thereof.

In certain embodiments, the invention provides a bioremediation system comprising an anodal source electrode and a cathodal counter electrode, both electrodes being operably connected to an electrical power supply, and both electrodes being placed in electrical contact with a soil and/or a groundwater, and a microorganism biocatalyst comprising an electricigenic microbe that can use electrons directly from the anodal source electrode to carry out a reductive dehalogenation of a contaminant that is present in the soil and/or groundwater. Typically, the contaminant is a chlorinated solvent, often the chlorinated solvent tetrachloroethene, trichloroethene, cis-dichloroethene, vinyl chloride, trichloroethane, tetrachloroethane, dichloroethane, chlorophenol, trichlorobenzene, chlorobenzoate, chloroacetic acid or a mixture thereof. In preferred embodiments, the reductive dehalogenation performed by the electricigenic microbe includes the conversion of tetrachloroethene to trichloroethene, trichloroethene to cis-dichloroethene or chlorophenol to phenol. Preferably, the microorganism biocatalyst comprises an electricigenic microbe from a strain of a *Geobacter* species or a strain of an *Anaeromyxobacter* species. In particularly preferred embodiments, the electricigenic microbe is from *Geobacter lovleyi* strain SZ or *Anaeromyxobacter dehalogenans* strain 2CP-1. In certain embodiments, the microorganism biocatalyst is pre-inoculated on the electrode that is used as the anode or anodal source electrode. Typically the microorganism biocatalyst forms a biofilm on the anodal source electrode.

In preferred embodiments, electrical power supply is connected to a commercial power grid, a photovoltaic power supply, a wind-driven power supply, a hydroelectric power supply, a fossil fuel generator, or an electrochemical cell power supply. Typically, at least one electrode is made of carbon paper, carbon cloth, carbon felt, carbon wool, carbon foam, graphite, porous graphite, graphite powder, conductive polymer, platinum, palladium, titanium, gold, silver, nickel, copper, tin, iron, cobalt, tungsten, stainless steel, or a combination thereof. In preferred embodiments, the anodal source electrode is poised to a potential of about −300 mV referenced to a standard hydrogen electrode.

In other preferred embodiments, the invention provides a carbon electrode comprising a microorganism biocatalyst comprising an electricigenic microbe selected from a strain of a *Geobacter* species or a strain of an *Anaeromyxobacter* species, wherein the electricigenic microbe is present in an amount sufficient to reductively dehalogenate a halogenated solvent when configured as an anode in a circuit in which electric current flows through a liquid containing the halogenated solvent. Such electrodes are advantageously used in a bioremediation system in which the carbon electrode is configured as an anodal source electrode, and a cathodal counter electrode is provided, both electrodes being operably connected to an electrical power supply, a third reference electrode operably connected to the anodal source and/or the cathodal counter electrode, all electrodes being placed in contact with a soil and/or a groundwater to form a completed electrical circuit, wherein the microorganism biocatalyst uses electrons provided directly from the anodal source electrode to carry out a reductive dehalogenation of a contaminant that is present in the soil and/or groundwater. In certain embodiments, the contaminant is a chlorinated solvent, often the chlorinated solvent tetrachloroethene, trichloroethene, cis-dichloroethene, vinyl chloride, trichloroethane, tetrachloroethane, dichloroethane, chlorophenol, trichlorobenzene, chlorobenzoate, chloroacetic acid or a mixture thereof. In preferred embodiments, the reductive dehalogenation performed by the electricigenic microbe includes the conversion of tetrachloroethene to trichloroethene, trichloroethene to cis-dichloroethene or chlorophenol to phenol.

Preferably, the microorganism biocatalyst comprises an electricigenic microbe from a strain of a *Geobacter* species or a strain of an *Anaeromyxobacter* species. In particularly preferred embodiments, the electricigenic microbe is from *Geobacter lovleyi* strain SZ or *Anaeromyxobacter dehalogenans* strain 2CP-1. In certain embodiments, the microorganism biocatalyst is pre-inoculated on the electrode that is used as the anode or anodal source electrode. Typically the microorganism biocatalyst forms a biofilm on the anodal source electrode.

In preferred embodiments, the electrical power supply is connected to a commercial power grid, a photovoltaic power supply, a wind-driven power supply, a hydroelectric power supply, a fossil fuel generator, or an electrochemical cell power supply. Typically, at least one electrode is made of carbon paper, carbon cloth, carbon felt, carbon wool, carbon foam, graphite, porous graphite, graphite powder, conductive polymer, platinum, palladium, titanium, gold, silver, nickel, copper, tin, iron, cobalt, tungsten, stainless steel, or a combination thereof. In preferred embodiments, the anodal source electrode is poised to a potential of about −300 mV referenced to a standard hydrogen electrode.

In other aspects, certain embodiments provide a method for in situ bioremediation of a halogenated contaminant that is present in a contaminant source zone, the contaminant source zone having a soil, a groundwater or both a soil and a groundwater, comprising the steps of placing a bioremediation system in the contaminant source zone, the bioremediation system comprising an anode and a cathode electrically connected to an electrical power supply, both electrodes being placed in electrical contact with the soil and/or the groundwater, and a microorganism biocatalyst comprising an electricigenic microbe that uses electrons provided directly from the anode to carry out a reductive dehalogenation of the halogenated contaminant in the soil and/or groundwater of the contaminant source zone; and causing electric current to flow to provide electrons from the anode to the microorganism biocatalyst to produce a reductive dehalogenation of the halogenated contaminant, thereby providing in situ bioremediation in a contaminant source zone.

Typically, the contaminant is a chlorinated solvent, often the chlorinated solvent tetrachloroethene, trichloroethene, cis-dichloroethene, vinyl chloride, trichloroethane, tetrachloroethane, dichloroethane, chlorophenol, trichlorobenzene, chlorobenzoate, chloroacetic acid or a mixture thereof. In preferred embodiments, the reductive dehalogenation performed by the electricigenic microbe includes the conversion of tetrachloroethene to trichloroethene, trichloroethene to cis-dichloroethene or chlorophenol to phenol. Preferably, the microorganism biocatalyst comprises an electricigenic microbe from a strain of a *Geobacter* species or a strain of an *Anaeromyxobacter* species. In particularly preferred embodiments, the electricigenic microbe is from *Geobacter lovleyi* strain SZ or *Anaeromyxobacter dehalogenans* strain 2CP-1. In certain embodiments, the microorganism biocatalyst is pre-inoculated on the electrode that is used as the anode or anodal source electrode. Typically the microorganism biocatalyst forms a biofilm on the anodal source electrode.

In preferred embodiments, the electrical power supply is connected to a commercial power grid, a photovoltaic power supply, a wind-driven power supply, a hydroelectric power supply, a fossil fuel generator, or an electrochemical cell power supply. Typically, at least one electrode is made of carbon paper, carbon cloth, carbon felt, carbon wool, carbon foam, graphite, porous graphite, graphite powder, conductive polymer, platinum, palladium, titanium, gold, silver, nickel, copper, tin, iron, cobalt, tungsten, stainless steel, or a combination thereof. In preferred embodiments, the anodal source electrode is poised to a potential of about −300 mV referenced to a standard hydrogen electrode.

In certain embodiments, an additional amount of a component of the microorganism biocatalyst is added to the contaminant source zone before, during or after the placement of the anode. A component of the microorganism biocatalyst can be indigenous to the contaminant source zone. In other embodiments, method includes the addition of one or more additional biocatalyst microorganisms at or near the contaminant source zone, wherein the additional microorganisms are capable of further reductive dehalogenation of one or more contaminants, In certain embodiments, the reductive dehalogenation of the contaminant facilitates dissolution of contaminant compounds into an aqueous phase in or near the contaminant source zone, thereby facilitating in situ bioremediation of non-aqueous halogenated solvent. In other embodiments, the method can be used in conjunction with a pump and treat method of removing chlorinated contaminants from groundwater at the contaminant source zone.

BRIEF DESCRIPTION OF THE DRAWINGS

FIG. 2A is a graph showing the results of fumarate reduction and formation of succinate, as well as the cumulative amount of electrons transferred. The amount of electrons transferred was consistent with 2e-required for each molecule of fumarate reduced. FIG. 2B is a graph showing the current flow from a monitored working electrode. Current flow began immediately after addition of media containing fumarate, and approached zero as fumarate was reduced.

FIG. 3A is a graph showing the results of 98 μmoles of PCE dechlorinated to TCE and cis-DCE within 72 hours when a fuel cell was connected to a potentiostat. FIG. 3B is a graph showing the results after disconnecting a fuel cell from the potentiostat; due to headspace equilibrium only a 5 μmole increase in cis-DCE was detected.

FIG. 4A is a graph showing the results of 87 μM 2-CPh (filled diamonds) dechlorinated to phenol (filed squares) within 4 days when the fuel cell was connected to the potentiostat. FIG. 4B is a graph showing the results of a duplicate incubation, illustrating the variability of dechlorination rates in duplicate incubations. FIG. 4C is a graph showing the results after disconnecting the fuel cell from the potentiostat, where dechlorination of 2-CPh ceased immediately. Phenol and 2-chlorophenol were analyzed by high pressure liquid chromatography.

FIG. 5A is a schematic illustration of a field site system configured with a potentiostat, and FIG. 5B is a schematic illustration of a field site system configured with a battery and a controller. FIG. 5A illustrates a field site system 100 that is powered by a local renewable energy source, in this embodiment, solar radiation. Field site system 100 comprises a photovoltaic system 110 that converts solar radiation 115 to electricity to charge a battery 120. The battery 120 provides DC (Direct Current) voltage to inverter 130, which provides AC (Alternating Current) voltage to power the potentiostat 140. The potentiostat 140 is linked by connectors 142 to electrodes: reference electrode 152, anode ("working electrode") 154, and cathode 156, which are placed beneath the surface 160 of the soil 162. Liquid in the soil completes the circuit between the anode 154 and the cathode 156, providing for the flow of electrons (e⁻, arrows).

FIG. 5B illustrates another embodiment 200 of a field site system that is powered by a local renewable energy source, in this embodiment, solar radiation. Field site system 200 comprises a photovoltaic system 110 that converts solar radiation 115 to electricity to charge a battery 120. The battery 120 provides DC voltage to a controller 230, which controls the current and voltage supplies to the electrode: reference electrode 152, anode ("working electrode") 154, and cathode 156, which are placed beneath the surface 160 of the soil 162. Liquid in the soil completes the circuit between the anode 154 and the cathode 156, providing for the flow of electrons (e⁻, arrows). Typically, the controller 230 includes a multimeter 232 and a user input device 234 for setting the desired current or voltage to be supplied to the anode 154 and the cathode 156.

DESCRIPTION OF PREFERRED EMBODIMENTS

Figure 1A:
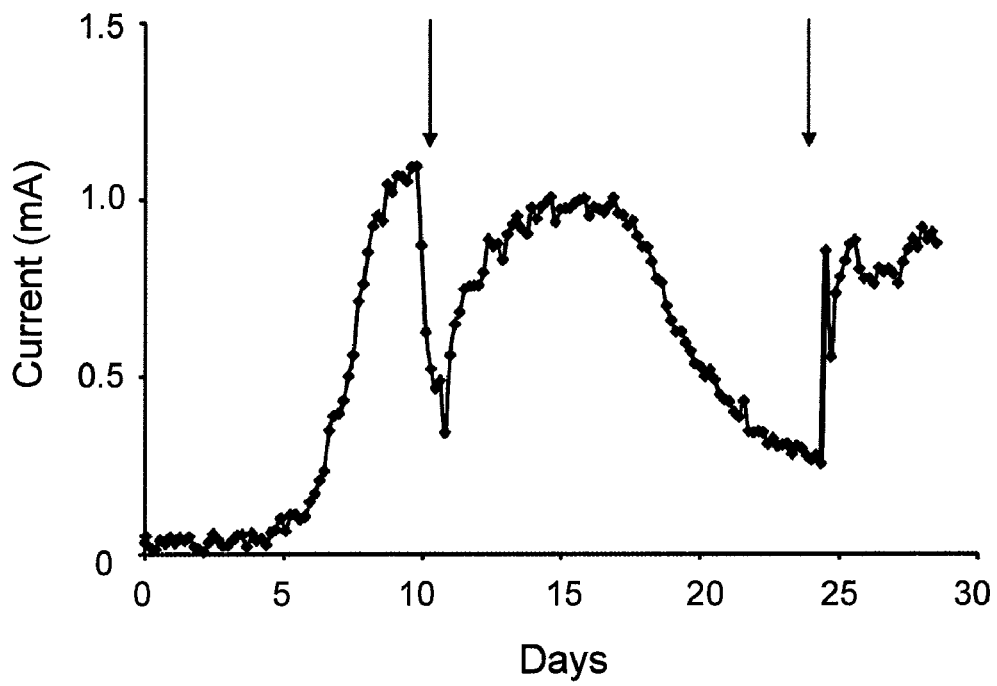
FIG. 1A is a graph showing the current production by *G. lovleyi* with acetate (10 mM) serving as the electron donor and a poised electrode serving as the electron acceptor. The arrows indicate when fresh acetate medium was added. The data are from a representative example of duplicate current producing cultures.

Provided are systems and methods which overcome several limitations of current abiotic and biotic methods of remediating sites contaminated with nonaqueous halogenated solvents, improving in situ bioremediation. The methods use a system having a poised source electrode, such as a graphite rod anode, for direct electron transfer to a strain of an electricigenic microorganism (e.g., *Geobacter lovleyi* or *Anaeromyxobacter dehalogenans*) that carries out reductive dehalogenation of a contaminant such as a chloroethene.

Definitions

Terms used herein shall have the following defined meanings, unless otherwise indicated.

The term "about" is used herein to mean approximately, in the region of, roughly, or around. When the term "about" is used in conjunction with a numerical range, it modifies that range by extending the boundaries above and below the numerical values set forth. In general, the term "about" is used herein to modify a value (e.g., a numerical value) above and below the stated value by 10%.

As used herein, "PCE," "perchloroethylene," "tetrachloroethylene," and "tetrachloroethene" refer to $Cl_2C=CCl_2$ (1,1,2,2-tetrachloroethylene, CAS Reg. No. 127-18-4).

As used herein, "TCE," "trichloroethylene," and "trichloroethene" refer to $Cl_2C=CHCl$ (1,1,2-Trichloroethene, CAS Reg. No. 79-01-6).

As used herein, "DCE," "dichloroethylene," and "dichloroethene" refer to $ClHC=CHCl$, cis-1,2-dichloroethylene (CAS Reg. No. 156-59-2), trans-1,2-dichloroethylene (CAS Reg. No. 156-60-5), or mixtures thereof.

As used herein, "VC" and "vinyl chloride" refer to $H_2C=CHCl$, 1-chloroethylene (CAS Reg. No. 75-01-4).

As used herein, "ethylene" and "ethene" refer to $H_2C=CH_2$.

As used herein, "chloroethenes" means PCE, TCE, DCE, VC, and mixtures thereof.

As used herein, "chlorophenol" refers to 2-chlorophenol ("2-CPh"), 3-chlorophenol ("3-CPh"), 4-chlorophenol ("4-CPh"), or dichlorophenols (2,4-dichlorophenol, 2,5-dichlorophenol, 2,6-dichlorophenol, and mixtures thereof).

As used herein, "biotransformation" means a biological reduction in the number of halogen, e.g., chlorine, atoms covalently bound to an organic compound. For example, PCE can be biotransformed to TCE, which can be biotransformed to DCE, which can be biotransformed to vinyl chloride (VC), which can be biotransformed to ethene. If the rate of biotransformation in or around a contaminated site is increased by adding an electron donor to a contaminated site, or by adding a microorganism capable of reductive dehalogenation, then bioremediation is enhanced.

As used herein, "biocatalyst" means a biological catalyst; a substance (e.g., a microorganism) that initiates, carries out, or modifies a rate of a chemical reaction (e.g., a biotransformation reaction).

As used herein, "working electrode" or "source electrode" refer to the anode. Similarly, as used herein, "corresponding electrode" refers to the cathode.

As used herein, "microorganism" or "microbe" means a microscopic organism, such as bacteria, protozoa, and some fungi and algae. Bacteria are illustrative microorganisms according to the present invention. Biotransformation may be enhanced, at least in part, by stimulating indigenous, naturally occurring microorganisms in a contaminated site (e.g., in soil and/or groundwater or a mixture thereof) using an electrode configuration of the present invention. If indigenous, naturally occurring microorganisms are not present or are not sufficiently effective, an appropriate microorganism can be added to a contamination site (e.g., groundwater, soil), in conjunction with a bioremediation system configuration of the present invention.

Biotransformation can be enhanced by stimulating microorganisms (e.g., either indigenous microorganisms, exogenous microorganisms that have been added to a contaminated site (e.g., to soil, groundwater, or a mixture thereof)). A microorganism can be added before, during, and/or after adding a bioremediation system configuration to a contaminated site (e.g., groundwater, soil). In certain preferred embodiments, the microorganism can be selected from *Geobacter lovleyi*, (e.g., strain SZ, ATCC BAA-1151), *Anaeromyxobacter dehalogenans* (e.g., strain 2CP-1, ATCC BAA-258), and mixtures thereof. Other electricigenic microbes, however, may be found to function similarly, and the methods and compositions may be applied to use of other applicable organisms. The present invention is not limited by examples provided herein.

Bioremediation Systems

The bioremediation systems include an electrical power supply, a source electrode, a counter electrode, and a microorganism biocatalyst comprising an electricigenic microbe that uses electrons from the source electrode to carry out reductive dehalogenation of a groundwater or soil contaminant. The provided bioremediation systems advantageously have a continuous localized physical source of electrons, which is less likely to enhance undesired activity of competing microorganisms and does not add toxic residual compounds to a contaminated site. The provided bioremediation systems facilitate formation of a biofilm comprising beneficial microorganisms capable of bioremediation through reductive dehalogenation of a groundwater or soil contaminant.

The formation of a biofilm has an additional benefit. The compositions and methods using microorganism biocatalysts forming a biofilm have increased tolerance for higher concentrations of contaminants (e.g., chlorinated DNAPLs) in a contaminated source zone, as compared, for example, to the same microorganism in a typical culture or growing condition. Thus, the provided bioremediation systems can enhance bioremediation without requiring addition of substances that result in creation of undesired by-products at a site, such as those required in previously described methods of bioaugmentation or biostimulation.

In one embodiment, a bioremediation system comprising a source electrode and counter electrode are provided for introduction to a contaminated site (e.g., a contaminated aquifer). A microorganism capable of using electrons from the source electrode for performing reductive dechlorination is also provided, whether exogenously or endogenously (e.g., a microorganism is added to a system, or is indigenous at a contaminated site where a system is or will be located). For example, a graphite electrode can be provided with a microorganism biocatalyst, comprising, e.g., a *Geobacter* species capable of direct electron transfer and dehalogenation of a groundwater or soil contaminant. In preferred embodiments, a source electrode can be pre-inoculated with a strain of an electricigenic microorganism, such as *Geobacter lovleyi* strain SZ, which is capable of direct electron transfer and reductive dechlorination of a contaminant of interest such as a chloroethene. In other preferred embodiments, a strain of an electricigenic microorganism, such as *Geobacter lovleyi* strain SZ, which is capable of direct electron transfer and reductive dechlorination of a contaminant of interest such as a chloroethene, is added to a bioremediation system comprising a source electrode and a counter electrode. In still other embodiments, a source electrode and a counter electrode are provided for introduction to a contaminated site, such as a contaminated aquifer, under conditions suitable for enrichment of one or more indigenous biocatalyst microorganism) capable of direct electron transfer from the provided source electrode, and reductive dehalogenation of a contaminant of interest (e.g., a chlorinated hydrocarbon).

Traditional microbial fuel cells are dual-chambered systems consisting of a source electrode and a counter electrode separated by a proton-permeable selective membrane. See, published U.S. patent application US2008/0286624, published Nov. 20, 2008, which is incorporated herein by reference.

In a field site situation, a proton-permeable selective membrane is not a necessary component of a bioremediation system. When used as a system for supply of electrons to microorganisms for reductive dechlorination of compounds, a poised, modified fuel cell (i.e., potentiostat poised fuel cell, or a battery powered fuel cell, can hold a source electrode potential at approximately −300 mV (vs. SHE)). A poise of −300 mV (vs. SHE) on the source electrode is not negative enough to produce significant quantities of by-products of water hydrolysis, such as hydrogen gas.

We have found that *Geobacter lovleyi* strain SZ, an electricigenic strain that has the ability to reduce PCE to cis-1,2-dichloroethene coupled to acetate oxidation, can reduce PCE to cis-1,2-dichloroethene when a poised graphite electrode serves as the only available electron donor. Additionally, we have found that *Anaeromyxobacter dehalogenans* can reduce 2-chlorophenol to phenol when a poised graphite electrode serves as the only available electron donor. To our knowledge this is the first report of a demonstration that electrodes may serve as an electron donor for in situ bioremediation of contaminants such as halogenated solvents. Furthermore, in contrast to the reversible metal reduction processes of electron acceptors such as uranium (VI) to insoluble uranium (IV), reduction of halogenated solvents is a non-reversible process resulting in the production of compounds that are more soluble in the aqueous phase.

In preferred embodiments, a microorganism biocatalyst comprises an electricigenic microbe such as a member of a *Geobacter* species, or a member of an *Anaeromyxobacter* species, or a mixture thereof. In some embodiments, a microorganism biocatalyst is exogenously added to a contaminated site as part of a bioremediation system. In other embodiments, a microorganism biocatalyst is indigenous to a contaminated site. An exogenous microorganism biocatalyst may be added to a contaminated source zone in advance of, in conjunction with, or after the setup of an in situ bioremediation system. Any combination of addition of microorganism biocatalyst timing may be included.

In certain embodiments, a microorganism biocatalyst comprises a *Geobacter* species. In preferred embodiments, the microorganism biocatalyst comprises a *Geobacter lovleyi* strain. In particularly preferred embodiments, the microorganism biocatalyst is *Geobacter lovleyi* strain SZ.

In certain embodiments, a microorganism biocatalyst comprises an *Anaeromyxobacter* species. In certain preferred embodiments, the microorganism biocatalyst comprises *Anaeromyxobacter dehalogenans*. In particularly preferred embodiments, the microorganism biocatalyst comprises *A. dehalogenans* strain 2CP-1, or *A. dehalogenans* strain 2-CP—C.

In some preferred embodiments, a carbon electrode is inoculated with a microorganism biocatalyst sufficiently in advance of the use of the electrode so that the an electricigenic microbe becomes established and forms a biofilm, wherein bacteria are in contact with the surface of an electrode (e.g., at least a single layer of cells is in contact with the electrode), resulting in changes in physiology and/or behavior because of the attached biofilm (e.g., capable of withstanding higher levels of toxic contaminant, create extracellular polysaccharide protective layer). As target compounds come into contact with a biofilm, electricigenic microbe that comprise the biofilm draw electrons from the electrode and transfer them to an electron acceptor contaminant, (e.g., a chloroethene such as PCE or TCE, resulting in reduction of the contaminant by dechlorination). In preferred embodiments, the microorganism biocatalyst can also comprise one or more substances that facilitate the formation of a biofilm by the electricigenic microbe and stabilize the relationship between the biofilm and the electrode.

In addition to providing a microbial mediator for charge transfer, the formation of a biofilm also promotes bacteria that will have an increased tolerance to high concentrations of contaminant (e.g., chlorinated solvents) present in a contaminated source zone. This effect counteracts one drawback of present approaches to bioremediation, and bioremediation effects may therefore be enhanced without excessive bioaugmentation or biostimulation. Using an electrode as an electron donor for dechlorinating microorganisms in the vicinity of and/or attached to an electrode surface allows for specific supply of electrons to a desired microorganism that is capable of facilitating biotransformation of halogenated contaminants.

Application of provided methods and compositions provides additional advantages over the practice of adding organic electron donors to a contaminated source zone. For example, addition of organic electron donors to a contaminated source zone stimulates the growth not only of desired microorganisms capable of dechlorination, but also stimulates growth of other competing anaerobic microbes. The present methods and compositions counteract this electron donor competition by providing an electron donor selective for electricigenic bacteria that have the unique ability to transfer electrons directly from the surface of a source electrode.

Electrodes that have been pre-inoculated or precolonized with dehalogenating (e.g., dechlorinating) microbial populations can provide a simple mechanism for delivering both a localized electron donor and a biocatalyst microorganism specifically where they are needed, such as near source zones. The very low current demands for these compositions and process could readily be supplied with a simple electrical power supply (e.g., a rechargeable battery, a solar panel, a wind turbine, etc.), providing a simple, sustainable, bioremediation option. A pre-inoculated anode also provides a convenient means of renewing or replacing the microbial population without removing or replacing the entire bioremediation system. Additionally since provided methods do not produce excess hydrogen, the present methods and compositions should not encourage competitive bacteria or affect features of the subsurface soil and groundwater, such as pH.

An electrode included in a bioremediation system according to the present invention is electrically conductive. Exemplary conductive electrode materials may include, but are not limited to, carbon paper, carbon cloth, carbon felt, carbon wool, carbon foam, graphite, porous graphite, graphite powder, a conductive polymer, platinum, palladium, titanium, gold, silver, nickel, copper, tin, iron, cobalt, tungsten, stainless steel, and combinations of these. In preferred embodiments, a pre-inoculated electrode comprises at least one of carbon paper, carbon cloth, carbon felt, carbon wool, carbon foam, graphite, porous graphite, or graphite powder.

Typically, an electrode provides a surface for attachment and growth of electricigenic bacteria and therefore an electrode is made of material compatible with bacterial growth and maintenance. Compatibility of a material with bacterial growth and maintenance in a bioremediation system may be assessed using standard techniques such as assay with a viability marker such as rhodamine 123, propidium iodide, SYTO® 9 (a proprietary fluorescent dye, Molecular Probes, Eugene, Oreg.), combinations of these or other bacteria viability markers, or visual inspection using microscopy techniques.

An electrode according to the present invention may be in contact with a microorganism biocatalyst in particular embodiments. For example, an electrode may retain a microorganism biocatalyst in a desired location in a particular embodiment. Optionally, electrode material can be configured to form a container for a microorganism biocatalyst.

Electrodes of various sizes and shapes may be included in a bioremediation system. In general, an electrode may be present in a reaction chamber wherein an electrode has a surface having any appropriate surface area according to the bioremediation system design and component limitations (e.g., size of contaminated site, distance from source zone, electrode material, size of well site, etc.).

In certain embodiments at least two electrodes are present and each of the electrodes may or may not be of the same shape and/or surface area. For example, in certain embodiments at least two electrodes are present in a bioremediation system comprising a source electrode and a counter electrode. In some embodiments, a source electrode has a surface having a surface area present in a reaction chamber, and a counter electrode has a surface having a surface area in the reaction chamber. In one embodiment, a ratio of the total surface area of source electrode to counter electrode in a bioremediation system is about 1:1. In one embodiment, the source electrode surface area in the reaction chamber is greater than the counter electrode surface area in the reaction chamber. This arrangement has numerous advantages such as lower cost where a counter electrode material is expensive, as where a platinum catalyst is included. In addition, a larger source electrode surface is typically advantageous to provide a growth surface for electricigens to transfer electrons to the source electrode. In a further preferred option a ratio of the source electrode surface area in the reaction chamber to the counter electrode surface area in the reaction chamber is in the range of 1.5:1-1000:1 and preferably 2:1-10:1.

Electrode dimensions may or may not be the same; electrodes may be positioned in various ways in relation to each other. For example, electrodes may be positioned in various ways to achieve a desired spacing between the electrodes. In one embodiment, a first electrode may be positioned such that its longest dimension is substantially parallel to the longest dimension of a second electrode. In a further embodiment, a first electrode may be positioned such that its longest dimension is substantially perpendicular with respect to the longest dimension of a second electrode. Additionally, a first electrode may be positioned such that its longest dimension is at an angle between 0 and 180 degrees with respect to the longest dimension of a second electrode.

In certain embodiments, electrodes have a longest dimension, and, in situations where at least a source electrode and a counter electrode are present, electrodes may be positioned such that the longest dimension of a source electrode is parallel to the longest dimension of a counter electrode. In another option, a source electrode and a counter electrode each have a longest dimension, and a source electrode and a counter electrode are positioned such that the longest dimension of a source electrode is perpendicular to the longest dimension of a counter electrode. In addition, a source electrode and a counter electrode may be positioned such that the longest dimension of a source electrode is at an angle in the range between 0 and 90 degrees with respect to the longest dimension of a counter electrode.

In some embodiments one or more additional reference electrode(s) may be included in a bioremediation system. In certain embodiments, a reference electrode may be further connected to a potentiostat or electrode controller.

An electrical power supply is operably connected to a provided electrode. A power supply used for enhancing an electrical potential may include, but is not limited to, a DC power supply connected to a commercial power grid, a photovoltaic power supply (e.g., a solar cell), a wind power supply (e.g., a wind turbine), a hydroelectric power supply, a fossil fuel generator supply (e.g., generator fueled by gasoline, propane or natural gas), or an electrochemical cell power supply such as a battery, or a capacitor.

In certain preferred embodiments, a potentiostat is operably connected to the electrodes and the power supply of a bioremediation system. In other embodiments, an electrode controller having a multimeter and a user input device for setting the desired current or voltage can be operably connected to the electrodes and to the power supply of a bioremediation system.

When a power supply is operably connected to a provided electrode for providing an electron source, the power supply is capable of providing sufficient current to deliver the necessary amount of electrons for the electron source in order to facilitate bioremediation. In certain embodiments, the power supply can provide an electric current of at least about one milliampere per second. In other embodiments, the power supply can provide an electric current of at least about one microampere per second. In still other embodiments, the power supply can provide an electric current of at least about one nanoampere per second. In yet other embodiments, the power supply can provide an electric current of about ten to about thirty microamperes per second. An electrode may be operably connected to a power supply, a potentiostat, or an electrode controller using an electrically conductive material such as a metallic material (e.g., copper, gold or platinum wires or connectors).

Methods of In Situ Bioremediation

Existing groundwater monitoring wells at a contaminated source zone may be used to introduce electrodes into a contaminated source zone. Alternatively, new wells may be implemented. In certain situations where existing wells are present, one or more new wells may be added, or may be preferable to use in order to maximize contact between a provided electrode and contaminant.

In some embodiments, methods of enhancing in situ bioremediation of a halogenated contaminant comprise improved biotransformation of one or more chlorinated solvents. In certain embodiments, the method promotes biotransformation of one or more chlorinated solvents selected from any of tetrachloroethene, trichloroethene, cis-dichloroethene, vinyl chloride, trichloroethane, tetrachloroethane, dichloroethane, chlorophenol, trichlorobenzenes, chlorobenzoate, chloroacetic acid, or a mixture thereof.

An appropriate application of use of bioremediation systems according to the present invention includes sites containing residual saturation levels of nonaqueous contaminants (e.g., halogenated solvents, chlorinated solvents) at source areas in the subsurface, which is common at both federal and industrial facilities. When very large, mobile DNAPL pools are present, mass transfer rates of contaminants to a mobile aqueous phase may be too slow to affect bioremediation in a reasonable time frame, and the present methods may be combined with other currently known methods (e.g., more aggressive, capital intensive approaches) for effective facilitation of bioremediation.

For example, provided methods and bioremediation systems may be used at a source zone in conjunction with currently preferred pump-and-treat method for removing contaminants from contaminated groundwater. The method usually involves withdrawing contaminated water from a well, volatilizing the contaminants in an air stripping tower, and adsorbing vapor-phase contaminants into granular-activated-carbon (GAC). While the pump and treat method is relatively inefficient, and some sites can require treatment for extended periods of time, it has been found effective for removal of high concentrations of contaminants such as large DNAPL pools. Thus, in certain embodiments, the present methods of bioremediation may be used in conjunction with pump and treat methods. In still other embodiments, the present methods may be used in conjunction with other known bioremediation remedies, including, but not limited to include thermal technologies such as stream-stripping, in situ chemical oxidation, surfactant flushing, or co-solvent flushing.

Although the strain used herein for dechlorination of PCE, *G. lovleyi* strain SZ, incompletely dehalogenates PCE to cis-DCE, conversion of PCE to cis-DCE near source zones can potentially be very effective for hastening dissolution of PCE source zones. In certain embodiments, the present methods and compositions facilitate dehalogenation of contaminant compounds (e.g., chlorinated solvents), such that biotransformation results in formation of compounds that are more soluble in an aqueous phase, thereby facilitating transfer of compounds, and bioremediation at a source contamination zone. In some embodiments, the method promotes biotransformation of PCE to TCE to cis-DCE, allowing for increased dissolution of cis-DCE in an aqueous phase. In some embodiments, the method promotes biotransformation of chlorophenol, allowing increased dissolution of phenol.

In some embodiments, subsequent treatment of biotransformation products (e.g., more soluble cis-DCE) with more traditional bioremediation strategies may be preferable for elimination of chlorinated solvents and associated biotransformation products, and/or further biotransformation to a less toxic substance.

Alternatively, the present compositions may be used in conjunction with addition of one or more other microorganism biocatalysts at a source zone, wherein the additional microorganism biocatalyst is capable of further reduction of biotransformation products (e.g., cis-DCE to vinyl chloride and to ethene), resulting in elimination of offending toxic compounds to a benign form. In still other embodiments, indigenous microorganism biocatalysts may be present at a source zone wherein such microorganism biocatalysts are capable of further biotransformation of biotransformation products (e.g., cis-DCE, vinyl chloride) and will produce non-toxic product (e.g., ethene). Thus, it may be possible that the promotion of biotransformation of chlorinated solvent (e.g., PCE to TCE to cis-DCE; 2CPh to Ph) allows for increased dissolution of biotransformation product(s) and further biotransformation by indigenous microorganisms is facilitated at or around the source zone contaminated site.

The finding that *G. lovleyi* can directly accept electrons from graphite electrodes for reductive dechlorination suggests that other organisms capable of complete dechlorination of PCE might be enriched with electrodes serving as the electron donor. Additionally, reductive dechlorination of 2-chlorophenol by *A. dehalogenans* demonstrates that the capacity for current-driven, biologically catalyzed dechlorination could be possible with a various microorganisms as well as with other chlorinated compounds (e.g., PCBs, chloroethanes, chlorobenzenes, chloroacetic acid, etc.).

In still other embodiments, provided methods may further comprise addition of compositions comprising one or more carbon sources and/or electron donors, wherein the addition of the compositions may provide additional energy sources and electron donors to expedite reductive dechlorination by microorganism biocatalysts and/or facilitate mass transfer of one or more nonaqueous chlorinated solvents into an aqueous phase in a manner that makes them highly bioavailable. For example, reductive dechlorination may occur through use of metallic, solid reaction elements, such as iron and zinc, to degrade chlorinated solvents and other organic compounds. Alternatively and/or additionally, use of lactate or derivatives thereof may be included in the present methods to facilitate reductive dehalogenation, as well as transport of chlorinated solvents into the aqueous phase and dramatically increase their bioavailability.

EXAMPLES

Materials and Methods

Source of bacterium, growth medium, and culture conditions. *Geobacter lovleyi* strain SZ (Sung, Y., et al., 2006. *Geobacter lovleyi* sp. nov. Strain SZ, a novel metal-reducing and tetrachloroethene-dechlorinating bacterium, *App. Env. Microbiol.* 72(4): 2775-2782) was obtained from Dr. Frank Löffler (Georgia Institute of Technology, Atlanta, Ga.). *Anaeromyxobacter dehalogenans* strain 2CP-1 (He, Q., and R. A. Sanford. 2003. Characterization of Fe(III) reduction by chlororespiring *Anaeromyxobacter dehalogenans*, *Appl. Environ. Microbiol.* 69(5): 2712-2718) was obtained from Dr. Robert Sanford (University of Illinois, Urbana-Champaign). Cultures were maintained on medium previously described by Bond and Lovley (Bond, D. R. & D. R., Lovley. 2003. Electricity production by *Geobacter sulfurreducens* attached to electrodes. Appl. Environ. Microbiol. 69(3): 1548-1555 and U.S. published patent application US 2008/0286624 published Nov. 20, 2008). Growth medium contained the following (per liter): 0.1 g of KCl, 0.2 g of $NH_4Cl$, 0.6 g of $NaH_2PO_4$, 10 ml of vitamin mix (16), and 10 ml of trace mineral mix (16). The medium was adjusted to pH 6.8, 2 g of $NaHCO_3$ was added, and the medium was flushed with $N_2$—$CO_2$ (80:20) to remove oxygen before autoclaving in sealed bottles. Regular NBAF medium had a composition per liter of deionized water is 0.42 g of $KH_2PO_4$, 0.22 g of $K_2HPO_4$, 0.2 g of $NH_4Cl$, 0.38 g of KCl, 0.36 g of NaCl, 0.04 g of $CaCl_2.2\ H_2O$, 0.1 g of $MgSO_4.7\ H_2O$, 1.8 g of $NaHCO_3$, 0.5 g of $Na_2CO_3$, 2.04 g of $NaC_2H_3O_2.3\ H_2O$, 6.4 g of $Na_2C_4H_4O_4$, 0.5 ml of 0.1% resazurin, 1.0 ml of 100 mM $Na_2SeO_4$, 10.0 ml of a vitamin solution, and 10.0 ml of NB trace mineral solution. The composition of the NB trace mineral solution per liter of deionized water was 2.14 g of nitrilo-acetic acid, 0.1 g of $MCl_2.4\ H_2O$, 0.3 g of $FeSO_4.7\ H_2O$, 0.17 g of $CoCl_2.6\ H_2O$, 0.2 g of $ZnSO_4.7\ H_2O$, 0.3 g of $CuCl_2.2\ H_2O$, 0.005 g of $AlK(SO_4)_2.12\ H_2O$, 0.005 g of $H_3BO_3$, 0.09 g of $Na_2MoO_4$, 0.11 g of $NiSO_4.6\ H_2O$, and 0.2 g of $Na_2WO_4.2H_2O$.

In batch cultures, acetate (10 mM) served as the electron donor and either fumarate (20 mM), PCE (195-391 µM starting aqueous concentration), or 2-CPh (50-150 µM) served as the electron acceptor. Cultures were maintained under strict anaerobic conditions with a mix of $N_2/CO_2$ (80:20).

Fuel cell experiments. Experiments were carried out using a dual chambered fuel cell similar to that previously described by Gregory, et al., 2004 (Gregory, K. B., D. R. Bond, and D. R. Lovley. 2004. Graphite Electrodes as electron donors for anaerobic respiration. *Environmental Microbiology* 6(6): 596-604) and Bond and Lovley (2003). Fuel cells were sealed with either a rubber gasket screw top with glass chimney, or in the case of cells receiving tetrachloroethylene (PCE) as the terminal electron acceptor, a ground glass top secured with air-tight tape. Cleaning procedures, fuel cell design, and connections between graphite and a potientiostat were as previously described by Gregory, et al. (2004) and Bond and Lovley (2003).

Fuel cells were connected to a potentiostat and a working electrode was poised at either +500 or −300 mV (vs. SHE), depending on whether the electrode served as an electron donor or an electron acceptor. A counter electrode was continuously bubbled with a mixture of $N_2/CO_2$ (80:20) when fumarate served as an electron acceptor for reduction of accumulating $O_2$ resulting from an anode reaction when current is drawn from the cathode; and a working electrode (anode) and counter electrode (cathode) were continuously bubbled when the working electrode served as the electron acceptor.

To prevent flushing of volatile chlorinated hydrocarbons from the system when PCE was used as an electron acceptor, the counter electrode was not bubbled. Rather, the working electrode chamber was flushed before adding PCE, and after connection to the potentiostat to ensure $H_2$ gas was completely removed from the chamber. A working electrode chamber of fuel cells receiving 2-chlorophenol as an electron acceptor were continuously flushed with a mixture of $N_2/CO_2$ (80:20). The accumulation of $O_2$ in the counter electrode chamber of fuel cells where PCE or 2-chlorophenol served as the electron acceptor was not a concern because current draw from the counter electrode was low. Control fuel cells for PCE and 2-chlorophenol reduction were treated in an identical manner. Both chambers of all fuel cells were continuously stirred at 130 rpm.

Cultures of log-phase, fumarate-grown *G. lovleyi* or *A. dehalogenans* were inoculated into fuel cells (10% inoculum) containing growth medium and allowed to pre-grow with both acetate (10 mM) and the poised graphite electrode (−300 mV vs. SHE) as available electron donors, and fumarate (20 mM) as the electron acceptor at 25° C. Growth medium was replaced when cells reached the density observed in batch cultures ($OD_{600}$ 0.1-0.2). When PCE or 2-chlorophenol were used as the terminal electron acceptor, fuel cells were inoculated with a culture of acetate and PCE grown cells (10% inoculum) in growth medium containing low levels of acetate (2 mM) and the poised graphite electrode (−300 mV) as the available electron donors and PCE (195 µM starting aqueous concentration) or 2-chlorophenol (50 µM) as the electron acceptor for pre-growing at room temperature in a fume hood.

Confocal laser scanning and electron microscopy. Confocal laser scanning microscopy (CSLM) was performed on working electrodes of fumarate grown biofilms as previously described by Gregory et al., 2004. For each sample, average biofilm thickness was calculated by examining between two and seven fields of view. Working electrodes were removed from fuel cells and fluorescently stained using a BacLight viability kit (Molecular Probes, Eugene, Oreg.). Divots carved into the working electrode surface allowed a coverslip to be placed over the graphite without compromising the imaging of the biofilm. Biofilm thickness was measured using a Zeiss LSM510 inverted microscope. Scanning electron microscopy (SEM) was performed on PCE grown biofilms. The working electrode was removed from the fuel cell and a small piece of graphite (1.5 cm×2.5 cm×0.1 cm thick) was cut out using a fine-toothed jeweler's saw. Pieces of graphite were fixed, dehydrated, and mounted. Cells were dyed with a live/dead stain before CLSM imaging. Live cells (or those with intact membranes) are stained green and dead cells (or those with compromised cell membranes) are stained red.

Analytical methods. Current measurements were collected as previously described using a Power Laboratory 4SP unit and CHART 4.0 software (AD Instruments). Analysis of volatile fatty acids was performed by high performance liquid chromatography (HPLC) (Shimadzu LC-10AT liquid chromatograph) with UV-Vis detector (Shimadzu SPD-10A VP) at a wavelength of 210 nm. The column used was an Aminex HPX-87H column (Biorad), and 8 mM $H_2SO_4$. Analysis of 2-chlorophenol was performed by HPLC (Hewlett-Packard 1100) with a diode array detector set at 275.6 nm. The eluent was phosphoric acid (0.1%)-buffered methanol-water (60/40 vol/vol) at a flow rate of 1.0 ml/min. Samples (0.5 ml) were filtered and made basic with 2M NaOH (5 µl). Analysis of PCE, TCE, and cis-DCE were carried out using a Perkin Elmer Clarus 600 gas chromatograph (GC) with a flame ionization detector (FID). Helium was used as the carrier gas at a split flow rate of 25 ml/min and VOCOL™ capillary column (60 m×0.25 mm, Sigma-Aldrich, St Louis, Mo.). Inlet temperature was set to 200° C., oven temperature was 140° C., and detector temperature was 250° C. Headspace samples (50 µl) were removed from fuel cells through sampling ports and injected manually onto the GC. Standard curves were generated using a methanol stock containing known amounts of each compound in headspace vials with the same headspace to aqueous phase ratio as the fuel cells. The concentration in the aqueous phase was determined using Henry's law constants for each compound at 24.8° C. Hydrogen was analyzed on a Carbosieve S-II column (Sigma-Aldrich, St Louis, Mo.) at room temperature with $N_2$ as the carrier gas, attached to a reduction gas analyzer (RGD2, Trace Analytical, Inc., Menlo Park, Calif.).

Example 1

G. Lovleyi is Capable of Accepting Electrons Directly from a Source Electrode

FIG. 1 is a graph showing the current production by *G. lovleyi* with acetate (10 mM) serving as the electron donor and a poised electrode serving as the electron acceptor. The arrows indicate when fresh acetate medium was added. The data are from a representative example of duplicate current producing cultures.

Figure 2A:
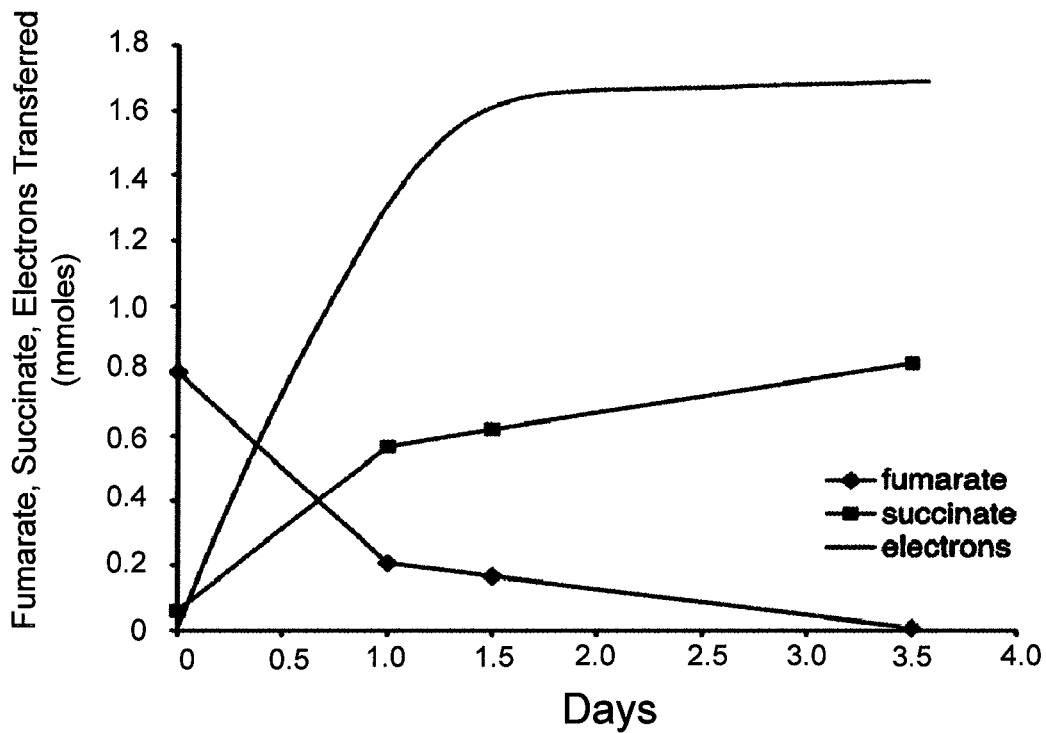
FIG. 2A and FIG. 2B are graphs showing the reduction of fumarate by *G. lovleyi*, and use of electrons from a graphite electrode as electron donor. After current transfer from the electrode was established with fumarate (20 mM) and low levels of acetate (2 mM), growth media was replaced with fresh media containing fumarate (0.8 mmoles) only.
Figure 2B:
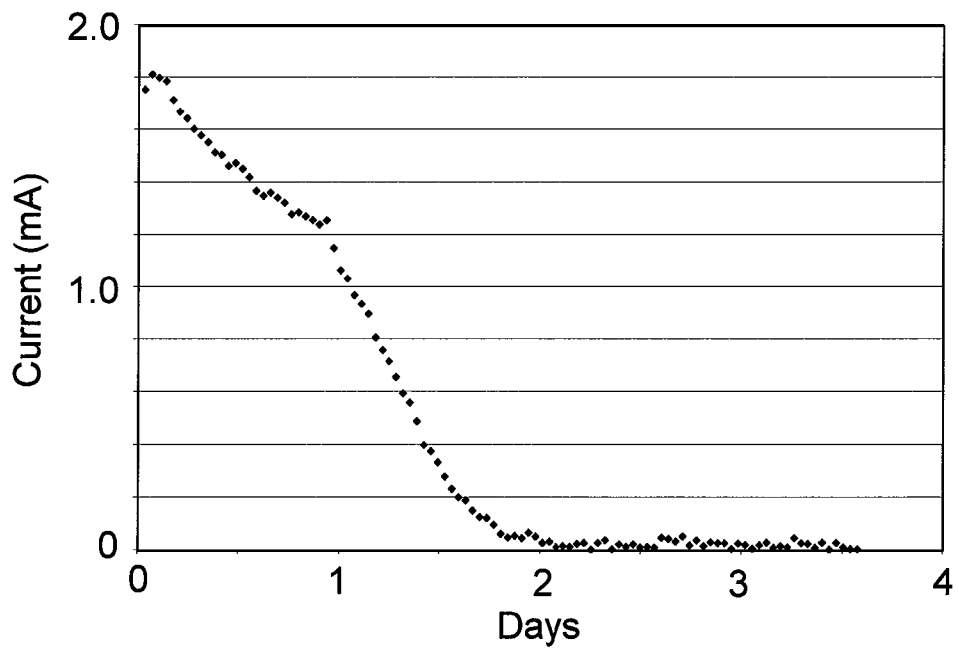

In order to determine whether *G. lovleyi* could also accept electrons from an electrode, studies similar to that previously described with *G. sulfurreducens* in which an electrode served as the electron donor and fumarate as the electron acceptor were performed. FIG. 2A and FIG. 2B are graphs showing the reduction of fumarate by *G. lovleyi*, and use of electrons from a graphite electrode as electron donor. After current transfer from the electrode was established with fumarate (20 mM) and low levels of acetate (2 mM), growth media was replaced with fresh media containing fumarate (0.8 mmoles) only. FIG. 2A is a graph showing the results of fumarate reduction and formation of succinate, as well as the cumulative electrons transferred. The stoichiometry of succinate (0.8 µmoles) produced and electrons transferred (1.6 µmoles) was at the ratio of 2:1 expected for the two electron reduction of fumarate to succinate.

Once established on the electrode, *G. lovleyi* reduced fumarate to succinate with the electrode serving as the sole electron donor. FIG. 2B is a graph showing the current flow from a monitored working electrode. Current flow began immediately after addition of media containing fumarate, and approached zero as fumarate was reduced.

Scanning electron microscopy revealed cells, attached or in close association with the electrode, were scattered on the electrode surface.

Example 2

G. Lovleyi does Reductive Dechlorination Using Electrons Directly from a Source Electrode In order to determine if reductive dechlorination was possible with an electrode serving as the electron donor, *G. lovleyi* was again grown in the presence of a poised electrode, but with acetate (2 mM) and PCE (39 µmoles) as the electron acceptor. The amount of PCE that can be added is much lower than the amount of fumarate, due to toxicity of PCE to the strain at high concentrations. Once reduction of PCE to cis-dichloroethene (cis-DCE) was observed, the medium was replaced with a new medium containing PCE (39 µmoles) as the electron acceptor, but with the electrode serving as the sole electron donor. Lactate (2 mM), which does not serve as an electron donor for *G. lovleyi* (Sung et al., 2006), was added as a carbon source. Once PCE was completely reduced to cis-DCE with the electrode serving as the electron donor, additional feedings of 39 µmoles were repeated until maximum rates of dechlorination (~25 µmoles/day) were observed., Higher amounts of PCE (98 µmoles) could be added without a toxic effect.

Figure 3A:
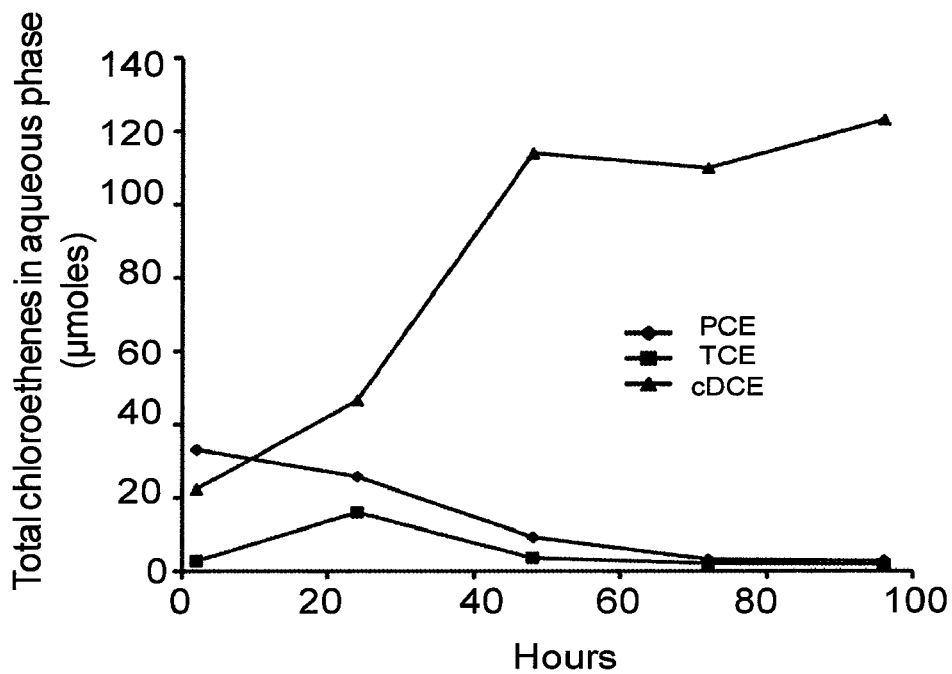
FIG. 3A and FIG. 3B are graphs showing the results of reductive dechlorination by *G. lovleyi* of tetrachloroethylene (PCE) to trichloroethylene (TCE) and cis-dichloroethene (cis-DCE) when a poised graphite electrode serves as the sole electron donor. Levels of PCE, TCE and cis-DCE were monitored.
Figure 3B:
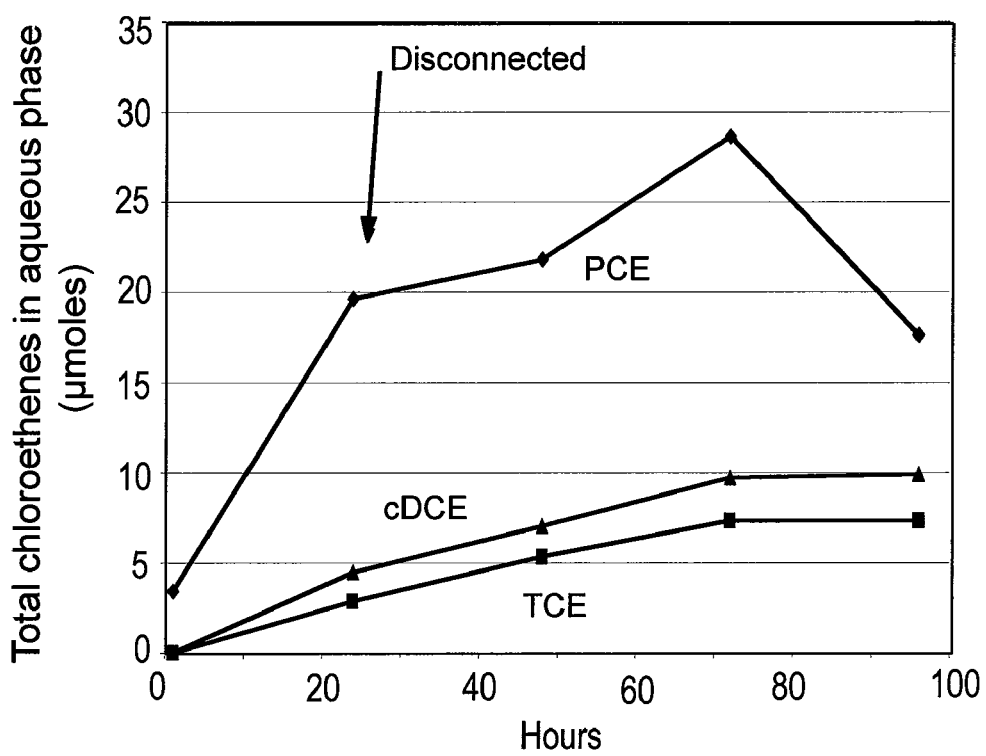

Once higher dechlorination rates were observed, the medium in the working electrode chamber was again replaced with fresh media, containing 98 µmoles of PCE and with the lactate carbon source omitted. In other studies where dechlorination is monitored over time culture bottles are typically amended with chlorinated ethenes prior to inoculation to achieve accurate starting measurements. However, since a biofilm is already established on the electrode, addition of PCE resulted in an immediate and steady accumulation of cis-DCE, accompanied by a slight transitory accumulation of TCE and the loss of PCE. See FIG. 3A. The rate of cis-DCE production was to maximum rates of cis-DCE production when acetate served as an electron donor. Slightly more cis-DCE accumulated than the amount of PCE added. This is attributed to dechlorination of PCE that had been added in previous feeding that adsorbed to the graphite electrode as the ability of PCE to adsorb to graphite is well known. No TCE or cis-DCE accumulated when the poised electrode system was not inoculated with *G. lovleyi*, consistent with previous findings that abiotic reduction of PCE would not be expected to be an important process at the potentials employed in this study. When the fuel cell was disconnected from the potentiostat after dechlorination had begun, PCE, TCE, and cis-DCE all increased slightly as they came to equilibrium with the headspace, however, cis-DCE accumulated to a maximum of only 10 µmoles. See FIG. 3B. Each data point represents duplicate headspace injections. The amount of chlorinated ethenes in the aqueous phase is based on the Henry's law constant for each compound at 24.8° C.

It was not possible to accurately measure current consumption during PCE reductive dechlorination because the amount of PCE that the culture could tolerate was too low. The conversion of PCE to cis-DCE in 72 h required a current consumption of about 11 to 29 μA/sec, which is within the range of background current for our monitoring system (±30-40 μA). As noted in a previous study (Bond & Lovley, 2003), at the potential at which the electrodes were poised there is little, if any, reduction of protons to produce hydrogen (≦2 hydrogen produced per h). Therefore, current-dependent reduction of PCE is attributed to *G. lovleyi* directly accepting electrons from the electrode surface and transferring the electrons to PCE.

Example 3

Figure 1B:
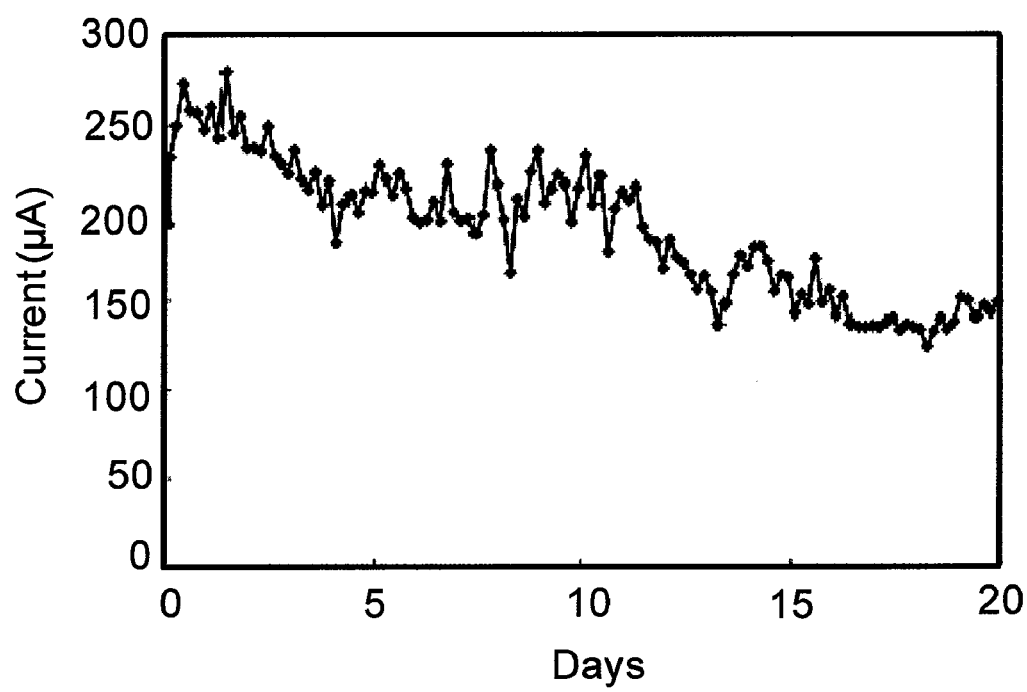
FIG. 1B is a graph showing the current production by *A. dehalogenans* strain 2CP-1 with acetate as the electron donor and poised graphite electrode (+500 mV vs. SHE (standard hydrogen electrode)). Cultures of *A. dehalogenans* were grown at room temperature (ca. 22-25° C.) under $N_2:CO_2$ (80:20) in 200 ml of stirred (180 rpm) medium in the 265 ml working electrode (anode) chamber of an anaerobic, dual-chambered electrode system as previously described. Acetate (10 mM) was provided as the electron donor, and initially both fumarate (40 mM) and the electrode (+300 mV vs. SHE) were available as electron acceptors. Time 0 in FIG. 1B represents the time at which the medium was exchanged with fumarate-free medium and the electrode served as the sole electron acceptor. The results shown are a representative data set from duplicate incubations.

*A. Dehalogenans* Reductive Dechlorination Using Electrons Directly from a Source Electrode Chlorinated aromatic compounds are another important class of chlorinated contaminants. *Anaeromyxobacter dehalogenans* species are capable of dehalogenating 2-chlorophenol. Like the *Geobacter* species, to which they are related, they are also capable of extracellular electron transfer to Fe(III). *A. dehalogenans* strain 2CP-1 produced current with acetate as the electron donor. FIG. 1B is a graph showing the current production by *A. dehalogenans* strain 2CP-1 with acetate as the electron donor and poised graphite electrode (+500 mV vs. SHE). Cultures of *A. dehalogenans* were grown at room temperature (ca. 22-25° under $N_2:CO_2$ (80:20) in 200 ml of stirred (180 rpm) medium in the 265 ml working electrode (anode) chamber of an anaerobic, dual-chambered electrode system. Acetate (10 mM) was provided as the electron donor, and initially, both fumarate (40 mM) and the electrode (+300 mV vs. SHE) were available as electron acceptors. Time 0 in the figure represents the time at which the medium was exchanged with fumarate-free medium and the electrode served as the sole electron acceptor. The results shown are a representative data set from duplicate incubations.

Figure 4A:
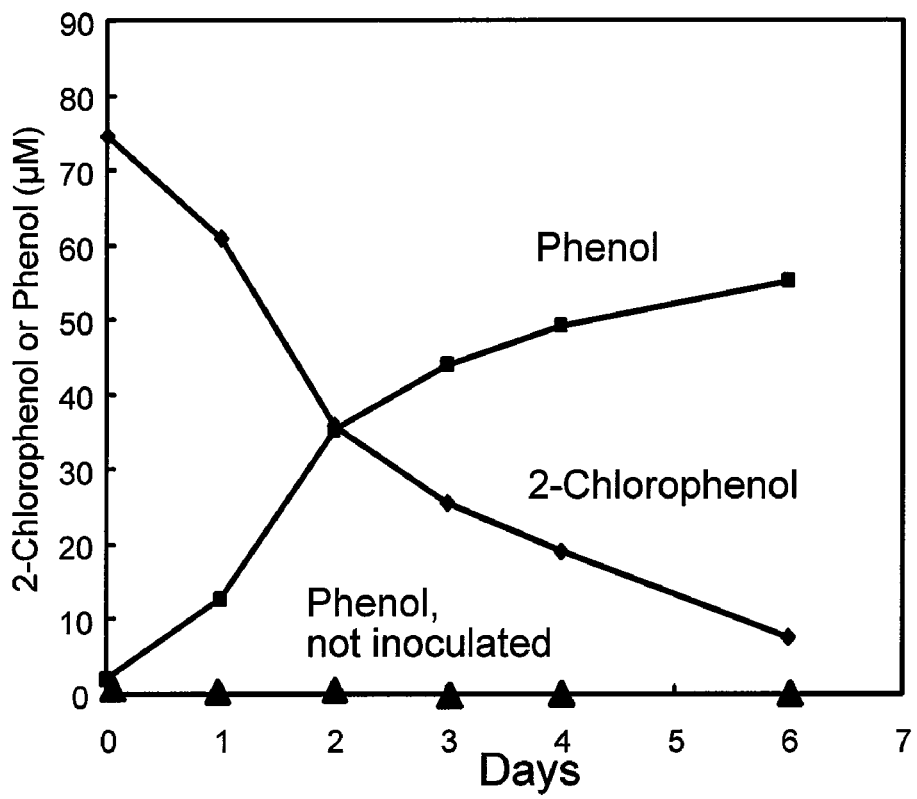
FIG. 4A, FIG. 4B and FIG. 4C are graphs showing the results of reductive dechlorination by *A. dehalogenans* of 2-chlorophenol (2-CPh) to phenol when a poised graphite electrode serves as the sole electron donor. Levels of 2-CPh and phenol were monitored.
Figure 4B:
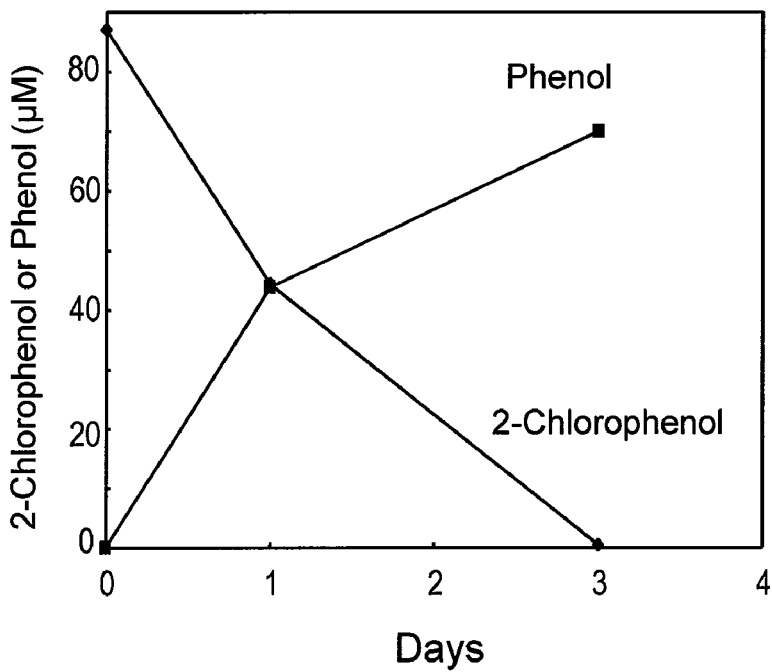
Figure 4C:
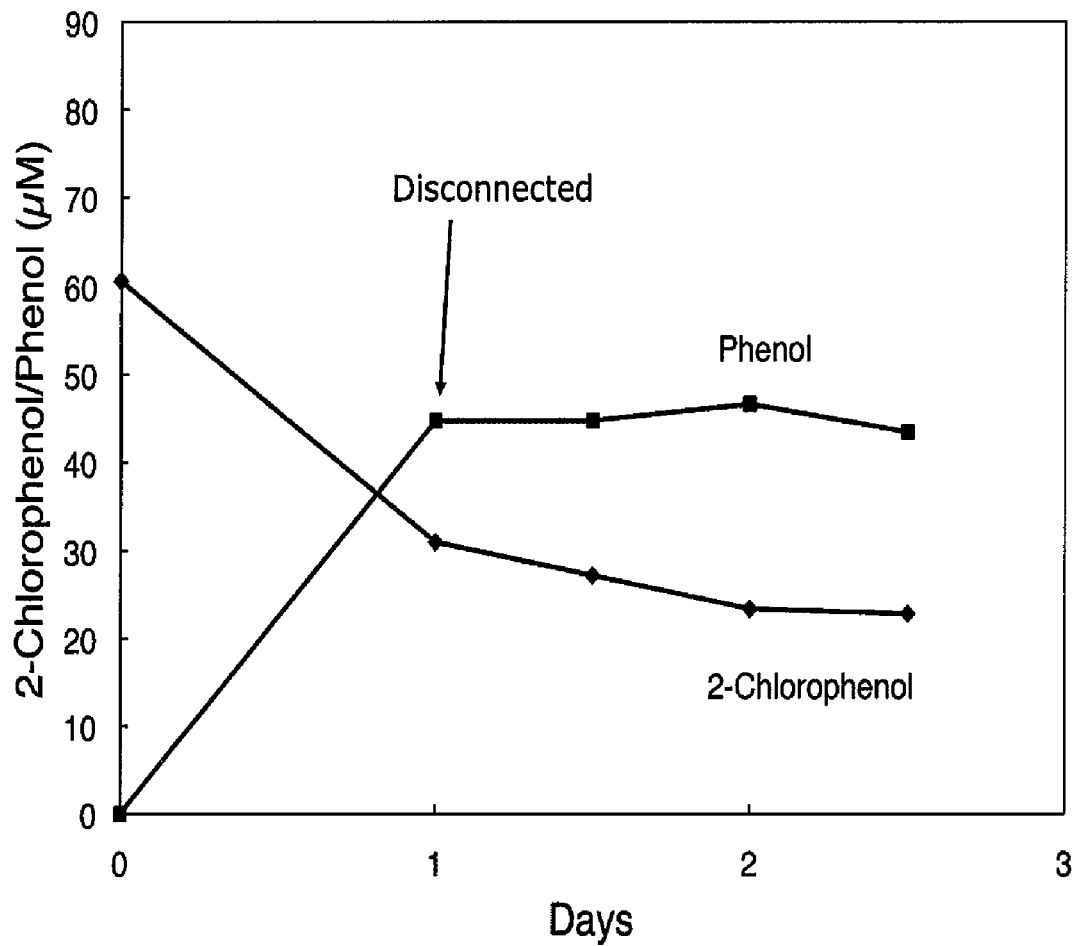

*A. dehalogenans* strain 2CP-1 was also capable of using an electrode poised at −300 mV as an electron donor for reductive dechlorination of 2-chlorophenol to phenol. FIG. 4A is a graph showing the results of 87 μM 2-chlorophenol (filled diamonds) dechlorinated to phenol (filed squares) within 4 days when the fuel cell was connected to the potentiostat. Phenol and 2-chlorophenol were analyzed by high pressure liquid chromatography. FIG. 4B is a graph showing the results of a duplicate incubation, illustrating the variability of dechlorination rates in duplicate incubations, compared to FIG. 4A. When an actively dechlorinating fuel cell was disconnected from the potentiostat, dechlorination ceased. Chlorophenol and phenol were lost to the system, presumably to adsorption at a rate consistent with uninoculated fuel cells. FIG. 4C is a graph showing the results after disconnecting the fuel cell from the potentiostat, where dechlorination of 2-chlorophenol ceased immediately. A steady loss of 2-chlorophenol occurred without an increase in phenol, and phenol began to decrease 24 hours after disconnection, both of which are consistent with abiotic control cells. These results demonstrate that *A. dehalogenans* catalyzes reductive dechlorination of chlorophenol with an electrode serving as the sole electron donor.

Example 4

Field Site Bioremediation Systems

A bioremediation system consisting of poised graphite electrodes may be delivered to the subsurface of a contaminated aquifer. For example, existing groundwater monitoring wells may be used to introduce such a bioremediation system into a contaminated source zone. Alternatively (or additionally), in some circumstances, new wells may be implemented in order to maximize contact between a biofilm coated electrode and contaminants at a site.

In one example, a bioremediation system consisting of a poised graphite source electrode (−) preinoculated with *G. lovleyi* strain SZ, may be delivered to a contaminated aquifer, wherein the electrode is connected to a potentiostat. The potentiostat is also operably connected to a counter electrode (+) and a reference electrode. Additionally, the potentiostat is operably connected to a power supply, such as a rechargeable battery. A rechargeable battery may be operably connected to a recharge system, including, e.g., a photovoltaic or solar panel. Furthermore, a voltage converter or inverter, is preferably included to convert 12V power from a battery to 100V AC power delivered to the potentiostat.

Figure 5A:
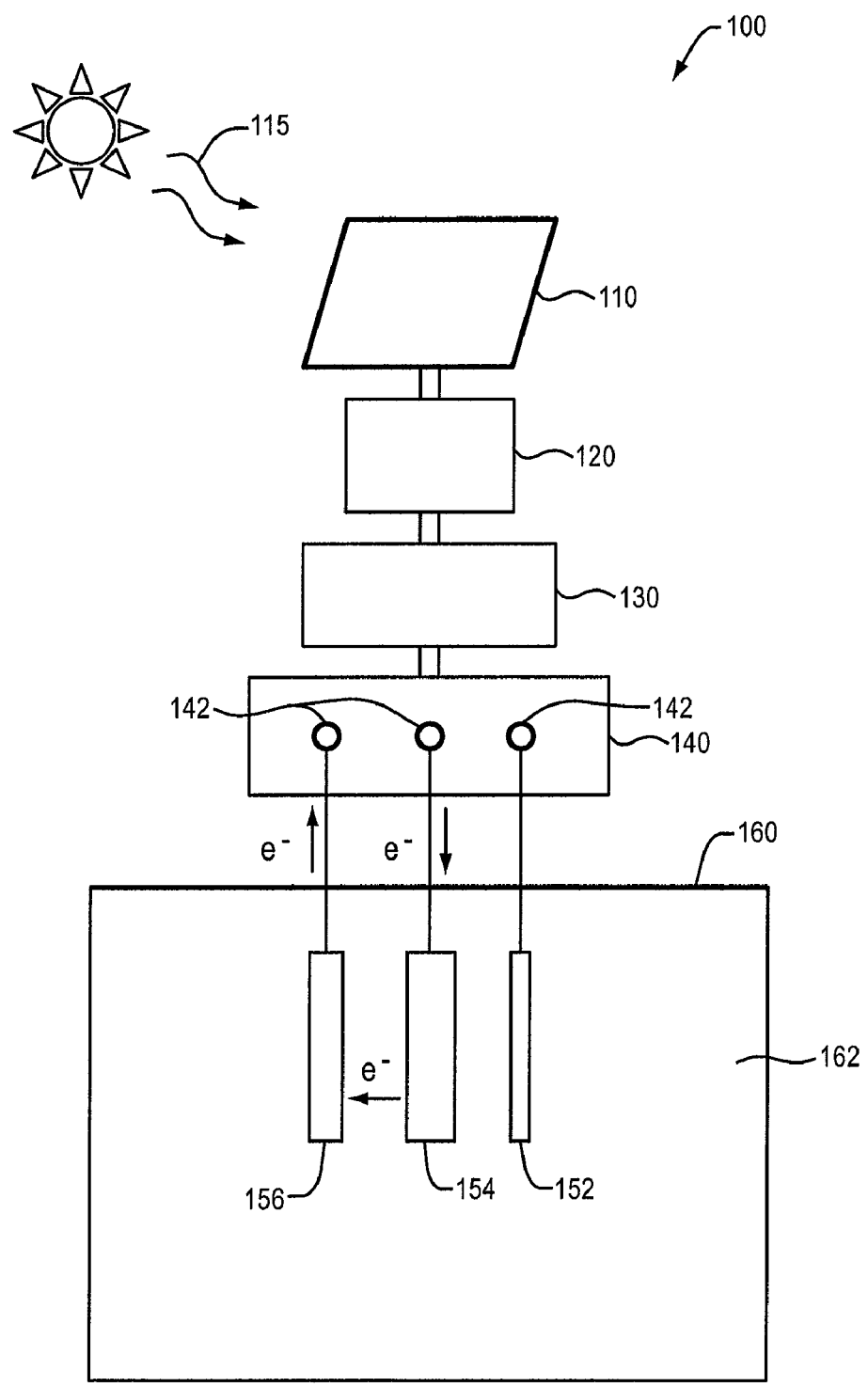
FIG. 5A and FIG. 5B are schematic illustrations of field site implementations of a system according to embodiments of the invention.

In the first example, a source electrode is provided to stimulate the pre-inoculated microorganisms to use the source electrode as electron donor for reductive dehalogenation of contaminants in the aquifer, and facilitate bioremediation at the contaminated source zone. FIG. 5A illustrates a field site system 100 that is powered by a local renewable energy source, in this embodiment, solar radiation. Field site system 100 comprises a photovoltaic system 110 that converts solar radiation 115 to electricity to charge a battery 120. The battery 120 provides DC voltage to inverter 130, which provides AC voltage to power the potentiostat 140. The potentiostat 140 is linked by connectors 142 to electrodes: reference electrode 152, anode ("working electrode") 154, and cathode 156, which are placed beneath the surface 160 of the soil 162. Liquid in the soil completes the circuit between the anode 154 and the cathode 156, providing for the flow of electrons ($e^-$, arrows).

Figure 5B:
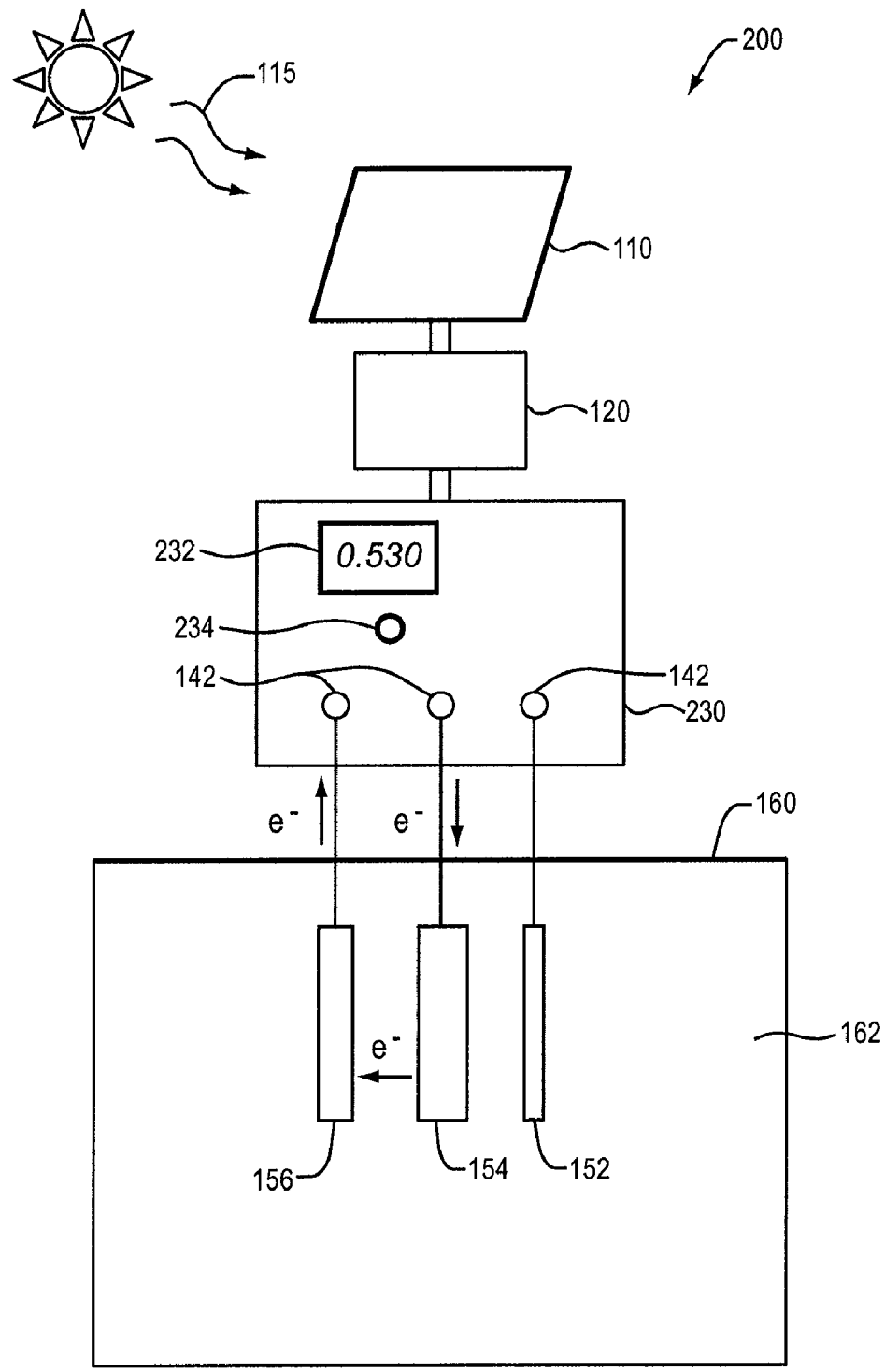

In another example, a bioremediation system consisting of a poised graphite source electrode (−) preinoculated with *G. lovleyi* strain SZ, may be delivered to a contaminated aquifer, wherein the electrode is connected to a power supply. The power source is also operably connected to a counter electrode (+). Optionally, an additional reference electrode is operably attached in the system, preferably through a connection to the source electrode. The power source may be any appropriate source, such as, e.g., a rechargeable battery. A rechargeable battery may be operably connected to a recharge system, including, e.g., a photovoltaic system or solar panel. Furthermore, a variable resistor is preferably included to control and maintain about a constant voltage delivered to the source electrode. FIG. 5B illustrates such an embodiment 200 of a field site system that is powered by a local renewable energy source, in this embodiment, solar radiation. Field site system 200 comprises a photovoltaic system 110 that converts solar radiation 115 to electricity to charge a battery 120. The battery 120 provides DC voltage to an electrode controller 230, which controls the current and voltage supplies to the electrode: reference electrode 152, anode ("working electrode") 154, and cathode 156, which are placed beneath the surface 160 of the soil 162. Liquid in the soil completes the circuit between the anode 154 and the cathode 156, providing for the flow of electrons ($e^-$, arrows). Typically, the electrode controller 230 includes a multimeter 232 and a user input device 234 for setting the desired current or voltage to be supplied to the anode 154 and the cathode 156.

Like the first example, a source electrode is provided to stimulate the pre-inoculated microorganisms to use the source electrode as electron donor for reductive dehalogenation of contaminants in the aquifer, and facilitate bioremediation at the contaminated source zone.

In still other embodiments, a bioremediation system according to one of those described above and depicted in FIG. 5A or FIG. 5B may be delivered to a contaminated aquifer, wherein a source electrode is not pre-inoculated with a microorganism biocatalyst. In certain conditions, a source contamination zone may contain indigenous microorganisms capable of utilizing provided electrodes as an electron donor, and capable of reductive dehalogenation of contaminants at the site. Alternatively, an exogenous microorganism biocatalyst may be added to the bioremediation system site, whether before, during, or after addition of the bioremediation system components. In such an example, a source electrode is provided to stimulate both the indigenous microorganism biocatalysts and/or exogenously added microorganism biocatalysts to use the electrode as electron donor for reductive dehalogenation of contaminants, and facilitate bioremediation at the contaminated source zone.

Publications and other reference materials referred to herein, including patent and non-patent literature, describe background of the invention and additional detail regarding knowledge available to one of skill in the art. Nothing herein is to be construed as an admission that the inventors are not entitled to antedate such disclosure by virtue of prior invention. Unless otherwise defined, technical and scientific terms used herein have the meaning commonly understood by one of ordinary skill in the art to which this invention belongs. Issued patents, published applications, and references that are cited herein are hereby incorporated by reference to the same extent as if each was specifically and individually indicated to be incorporated by reference. In the case of inconsistencies, the present disclosure, including definitions, will control.

While the foregoing invention has been described in some detail for purposes of clarity and understanding, particular embodiments are to be considered as illustrative and not restrictive to the particular configurations, process steps and materials disclosed herein. It will be appreciated by one skilled in the art from a reading of this disclosure that various changes in form and detail can be made without departing from the true scope of the invention, which is defined by the appended claims rather than by the specific embodiments.

What is claimed is:

1. A bioremediation system comprising an anodal source electrode and a cathodal counter electrode, both electrodes being operably connected to an electrical power supply, and both electrodes being placed in electrical contact with a soil and/or a groundwater, and a microorganism biocatalyst selected from either cells of *Geobacter lovleyi* strain SZ or cells of *Anaeromyxobacter dehalogenans* strain 2CP-1 that accept electrons directly from the anodal source electrode, without the use of an electron-transporting mediator, to carry out a reductive dechlorination of a chlorinated solvent that is present in the soil and/or groundwater.

2. The bioremediation system of claim 1 wherein the contaminant is a chlorinated solvent.

3. The bioremediation system of claim 2 wherein the chlorinated solvent is selected from the group consisting of tetrachloroethene, trichloroethene, cis-dichloroethene, vinyl chloride, trichloroethane, tetrachloroethane, dichloroethane, chlorophenol, trichlorobenzene, chlorobenzoate, chloroacetic acid and a mixture thereof.

4. The bioremediation system of claim 3 wherein the reductive dechlorination includes at least one conversion selected from tetrachloroethene to trichloroethene, trichloroethene to cis-dichloroethene or chlorophenol to phenol.

5. The bioremediation system of claim 1 wherein the microorganism biocatalyst is pre-inoculated on the anodal source electrode.

6. The bioremediation system of claim 1 wherein the electrical power supply is a DC power supply connected to a commercial power grid, a photovoltaic power supply, a wind-driven power supply, a hydroelectric power supply, a fossil fuel generator, or an electrochemical cell power supply.

7. The bioremediation system of claim 1 wherein at least one electrode is made of carbon paper, carbon cloth, carbon felt, carbon wool, carbon foam, graphite, porous graphite, graphite powder, conductive polymer, platinum, palladium, titanium, gold, silver, nickel, copper, tin, iron, cobalt, tungsten, stainless steel, or a combination thereof.

8. The bioremediation system of claim 1 wherein the microorganism biocatalyst forms a biofilm on the anodal source electrode.

9. The bioremediation system of claim 1 wherein the anodal source electrode is poised to a potential of about −300 mV referenced to a standard hydrogen electrode.

10. A carbon electrode comprising a microorganism biocatalyst comprising an electricigenic microbe selected from either cells of *Geobacter lovleyi* strain SZ or cells of *Anaeromyxobacter dehalogenans* strain 2CP-1, wherein the electricigenic microbe is present in an amount sufficient to reductively dehalogenate a halogenated solvent when configured as an anode in a circuit in which electric current flows through a liquid containing the halogenated solvent.

11. A bioremediation system comprising the carbon electrode of claim 10 configured as an anodal source electrode and a cathodal counter electrode, both electrodes being operably connected to an electrical power supply, a third reference electrode operably connected to the anodal source and/or the cathodal counter electrode, all electrodes being placed in contact with a soil and/or a groundwater to form a completed electrical circuit, wherein the microorganism biocatalyst uses electrons provided directly from the anodal source electrode to carry out a reductive dehalogenation of a contaminant that is present in the soil and/or groundwater.

12. The bioremediation system of claim 11 wherein the contaminant is a chlorinated solvent selected from the group consisting of tetrachloroethene, trichloroethene, cis-dichloroethene, vinyl chloride, trichloroethane, tetrachloroethane, dichloroethane, chlorophenol, trichlorobenzenes, chlorobenzoate, chloroacetic acid, and mixtures thereof.

13. The bioremediation system of claim 12 wherein the reductive dehalogenation includes at least one conversion selected from tetrachloroethene to trichloroethene, trichloroethene to cis-dichloroethene or chlorophenol to phenol.

14. The bioremediation system of claim 11 wherein the electrical power supply is connected to a commercial power grid, a photovoltaic power supply, a wind-driven power supply, a hydroelectric power supply, a fossil fuel generator, or an electrochemical cell power supply.

15. The carbon electrode of claim 10 wherein the electrode comprises at least one of carbon paper, carbon cloth, carbon felt, carbon wool, carbon foam, graphite, porous graphite, or graphite powder.

16. The bioremediation system of claim 11 wherein at least one of the cathode and the reference electrode is made of carbon paper, carbon cloth, carbon felt, carbon wool, carbon foam, graphite, porous graphite, graphite powder, conductive polymer, platinum, palladium, titanium, gold, silver, nickel, copper, tin, iron, cobalt, tungsten, stainless steel, or a combination thereof.

17. The bioremediation system of claim 11 wherein the anodal source electrode is poised to a potential of about −300 mV referenced to a standard hydrogen electrode.

* * * * *